US012750900B2

(12) United States Patent
Kuppa et al.

(10) Patent No.: US 12,750,900 B2
(45) Date of Patent: Sep. 29, 2026

(54) TRANSMITTING BLUETOOTH AUDIO DATA OVER A WI-FI LINK

(71) Applicant: QUALCOMM Incorporated, San Diego, CA (US)

(72) Inventors: Srikant Kuppa, Fremont, CA (US); Sandip Homchaudhuri, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 18/695,248

(22) PCT Filed: Feb. 28, 2022

(86) PCT No.: PCT/US2022/018209

§ 371 (c)(1),
(2) Date: Mar. 25, 2024

(87) PCT Pub. No.: WO2023/101712

PCT Pub. Date: Jun. 8, 2023

(65) Prior Publication Data

US 2025/0151136 A1 May 8, 2025

(30) Foreign Application Priority Data

Dec. 1, 2021 (IN) ............................ 202141055609

(51) Int. Cl.
*H04W 76/12* (2018.01)
*H04L 12/46* (2006.01)
(Continued)

(52) U.S. Cl.
CPC ......... *H04W 76/12* (2018.02); *H04L 12/4633* (2013.01); *H04W 76/14* (2018.02); *H04W 4/90* (2018.02)

(58) Field of Classification Search
CPC ....... H04W 76/12; H04W 76/14; H04W 4/90; H04W 88/04; H04W 4/80; H04W 4/18;
(Continued)

(56) References Cited

U.S. PATENT DOCUMENTS 11,132,172 B1 * 9/2021 Naik ...................... G10H 1/361
2008/0175213 A1 7/2008 Hansen
(Continued)

OTHER PUBLICATIONS

Cho H-W., et al., "BlueFi: Bluetooth over WiFi", Proceedings of the 2021 ACM Sigcomm 2021 Conference, ACMPUB27, New York, NY, USA, Aug. 9, 2021, pp. 475-487, XP058646872, DOI: 10.1145/3452296.3472920, ISBN: 978-1-4503-8383-7, Abstract, Sections 1 and 4.7.
(Continued)

*Primary Examiner* — Obaidul Huq
(74) *Attorney, Agent, or Firm* — Holland & Hart LLP

(57) ABSTRACT

This disclosure provides methods, devices, and systems for transmitting Bluetooth audio data over a Wi-Fi channel associated with one or more Wi-Fi channels. In some instances, a wireless communication device operating as a wireless station (STA) associated with an access point (AP) while operating as a softAP paired with a peripheral device via a Bluetooth protocol receives one or more first data packets over a Wi-Fi channel from the AP, the one or more first data packets carrying audio data intended for the peripheral device. The device processing the audio data based at least in part on a stored Bluetooth profile, and embeds the processed audio data into Ethernet frames of a new Ethertype. The new Ethertype frames are encapsulated within one or more second data packets and transmitted over the Wi-Fi channel to the peripheral device.

27 Claims, 15 Drawing Sheets

(51) Int. Cl.
*H04W 76/14* (2018.01)
*H04W 4/90* (2018.01)

(58) Field of Classification Search
CPC .... H04W 84/12; H04W 88/06; H04L 12/4633
USPC .......................................... 370/310, 328, 329
See application file for complete search history.

(56) References Cited

U.S. PATENT DOCUMENTS

| | | | | |
|---|---|---|---|---|
| 2010/0029325 | A1* | 2/2010 | Wang | H04W 72/1215 455/553.1 |
| 2012/0099562 | A1* | 4/2012 | Smadi | H04W 36/302 370/332 |
| 2014/0113690 | A1* | 4/2014 | Shanmugasundaram | H04W 52/0251 455/574 |
| 2014/0269508 | A1 | 9/2014 | Donaldson | |
| 2021/0314525 | A1* | 10/2021 | Raduchel | H04N 7/157 |
| 2022/0174392 | A1* | 6/2022 | Jorgovanovic | H04R 1/1091 |

OTHER PUBLICATIONS

International Search Report and Written Opinion—PCT/US2022/018209—ISA/EPO—Aug. 4, 2022.

* cited by examiner

400C

400D

1100

TRANSMITTING BLUETOOTH AUDIO DATA OVER A WI-FI LINK

CROSS-REFERENCE TO RELATED APPLICATIONS

The present Application is a 371 national stage filing of International PCT Application No. PCT/US2022/018209 by KUPPA et al. entitled "TRANSMITTING BLUETOOTH AUDIO DATA OVER A WI-FI LINK," filed Feb. 28, 2022; and claims priority to Indian Patent Application number 202141055609 by KUPPA et al. entitled "TRANSMITTING BLUETOOTH AUDIO DATA OVER A WI-FI LINK," filed Dec. 1, 2021, each of which is assigned to the assignee hereof, and each of which is expressly incorporated by reference in its entirety herein.

TECHNICAL FIELD

This disclosure relates generally to wireless communications, and more specifically, to transmitting data to a Bluetooth-connected device over a Wi-Fi channel.

DESCRIPTION OF THE RELATED TECHNOLOGY

A wireless personal area network (WPAN) is a short-range wireless network typically established by a user to interconnect various personal devices, sensors, and/or appliances located within a certain distance or area of the user. For example, WPANs based on communication protocols such as a Bluetooth® (BT) protocol, a Bluetooth® Low Energy protocol, or a Zigbee® protocol may provide wireless connectivity to peripheral devices within a specific distance (e.g., 5 meters, 10 meter, 20 meters, 100 meters, etc.) of the user.

Bluetooth is a short-range wireless communication protocol that supports a WPAN between a central device and at least one peripheral device. Power consumption associated with Bluetooth communications may render Bluetooth impractical in certain applications.

To address the power consumption issue associated with Bluetooth, Bluetooth® Low Energy (BLE) was developed and adopted in various applications in which data transfers are relatively infrequent. Specifically, BLE exploits the infrequent transfer of data by using a low duty cycle operation, and placing one or both the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE enabled smart phones, tablets, and laptops. While traditional Bluetooth and BLE offer certain advantages, there exists a need for further improvements in Bluetooth and BLE technology. For example, traditional Bluetooth and BLE have limited range, have limited data capacity throughput, and are susceptible to interference from other devices communicating in the same frequency band (e.g., Wi-Fi communications).

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication by a wireless communication device. In some implementations, the method includes operating the wireless communication device as a wireless station (STA) associated with an access point (AP) concurrently with operating the wireless communication device as a softAP paired with a peripheral device according to a Bluetooth protocol. The method includes receiving one or more first data packets over a Wi-Fi channel from the AP, the one or more first data packets carrying audio data intended for the peripheral device. The method includes processing the audio data based at least in part on a Bluetooth profile stored in the wireless communication device. The method includes embedding the processed audio data into Ethernet frames of a new Ethertype. The method includes encapsulating the Ethernet frames of the new Ethertype within one or more second data packets. The method includes transmitting the one or more second data packets to the peripheral device over the Wi-Fi channel. In some instances, the Wi-Fi channel may be a wireless channel in a sub-GHz frequency band, a 2.4 GHz frequency band, a 5 GHz frequency band, a 6 GHz frequency band, or a 60 GHz frequency band. In some other instances, the Wi-Fi channel may occupy one or more portions of another frequency band.

In some implementations, the wireless communication device may be a smartphone, and the peripheral device may be one or more pairs of earbuds, one or more headphones, or one or more headsets. In some instances, the audio data may be an audio stream associated with one or more of a real-time gaming application, a voice back-channel corresponding to the real-time gaming application, a real-time augmented reality (AR) application, a real-time virtual reality (VR) application, a real-time AR/VR application, streaming music, or streaming video. In some aspects, the audio data may be latency-sensitive traffic associated with a real-time application executed by the wireless communication device. In some implementations, the first and second data packets may be physical layer convergence protocol (PLCP) protocol data units (PPDUs) compliant with the IEEE 802.11 family of wireless communication standards.

In some implementations, processing the audio data may include routing the one or more first data packets to an application processor via a Peripheral Component Interconnect Express (PCIe) bus, and extracting raw audio data from the one or more first data packets using the application processor. Processing the audio data may also include encoding the raw audio data in an audio subsystem coupled to the application processor, and routing the encoded raw audio data from the audio subsystem to a WLAN subsystem over a direct link between the audio subsystem and the WLAN subsystem. In some aspects, the direct link is based on a PCIe bus architecture, and allows the encoded raw audio data to be routed directly to the WLAN subsystem for transmission without passing through the application processing subsystem. For example, the encoded raw audio data may be routed from the audio subsystem to the WLAN subsystem over the direct link without passing through a Transport Control Protocol (TCP)/Internet Protocol (IP) (TCP/IP) stack within or associated with the application processing subsystem. In some instances, the WLAN subsystem may encapsulate the Ethernet frames within the one or more second data packets based on the new Ethertype. In some aspects, the WLAN subsystem may also transmit the one or more second data packets over a WLAN link or channel to the peripheral device.

Another innovative aspect of the subject matter described in this disclosure can be implemented in a wireless communication device. In some implementations, the wireless communication device includes one or more wireless radios, one or more processors coupled to the one or more wireless radios, and a memory coupled to the one or more processors. In some instances, the memory stores instructions that, when executed by the one or more processors in conjunction with the one or more wireless radios, is configured to operate the wireless communication device as a STA associated with an AP concurrently with operating the wireless communication device as a softAP paired with a peripheral device according to a Bluetooth protocol. Execution of the instructions is configured to receive one or more first data packets over a Wi-Fi channel from the AP, the one or more first data packets carrying audio data intended for the peripheral device. Execution of the instructions is configured to process the audio data based at least in part on a Bluetooth profile stored in the wireless communication device. Execution of the instructions is configured to embed the processed audio data into Ethernet frames of a new Ethertype. Execution of the instructions is configured to encapsulate the Ethernet frames of the new Ethertype within one or more second data packets. Execution of the instructions is configured to transmit the one or more second data packets to the peripheral device over the Wi-Fi channel. In some instances, the Wi-Fi channel may be a wireless channel in a sub-GHz frequency band, a 2.4 GHz frequency band, a 5 GHz frequency band, a 6 GHz frequency band, or a 60 GHz frequency band. In some other instances, the Wi-Fi channel may occupy one or more portions of another frequency band.

In some implementations, the wireless communication device may be a smartphone, and the peripheral device may be one or more pairs of earbuds, one or more headphones, or one or more headsets. In some instances, the audio data may be an audio stream associated with one or more of a real-time gaming application, a voice back-channel corresponding to the real-time gaming application, a real-time AR application, a real-time VR application, a real-time AR/VR application, streaming music, or streaming video. In some aspects, the audio data may be latency-sensitive traffic associated with a real-time application executed by the wireless communication device. In some implementations, the first and second data packets may be PPDUs compliant with the IEEE 802.11 family of wireless communication standards.

In some implementations, processing the audio data may include routing the one or more first data packets to an application processor via a PCIe bus, and extracting raw audio data from the one or more first data packets using the application processor. Processing the audio data may also include encoding the raw audio data in an audio subsystem coupled to the application processor, and routing the encoded raw audio data from the audio subsystem to a WLAN subsystem over a direct link between the audio subsystem and the WLAN subsystem. In some aspects, the direct link is based on a PCIe bus architecture, and allows the encoded raw audio data to be routed directly to the WLAN subsystem for transmission without passing through the application processor subsystem. For example, the encoded raw audio data may be routed from the audio subsystem to the WLAN subsystem over the direct link without passing through a TCP/IP stack within or associated with the application processor subsystem. In some instances, the WLAN subsystem may encapsulate the Ethernet frames within the one or more second data packets based on the new Ethertype. In some aspects, the WLAN subsystem may also transmit the one or more second data packets over a WLAN link or channel to the peripheral device.

Another innovative aspect of the subject matter described in this disclosure can be implemented in a wireless communication device. In some implementations, the wireless communication device includes a WLAN subsystem, a Bluetooth subsystem, an application processor subsystem coupled to each of the WLAN subsystem and Bluetooth subsystem, an audio subsystem coupled to the application processor subsystem, and a direct link connected between the audio subsystem and the WLAN subsystem. The WLAN subsystem may be configured to receive one or more first data packets over a Wi-Fi channel from an AP. In some instances, the one or more first data packets carry audio data intended for a peripheral device associated with the wireless communication device. The Bluetooth subsystem can establish a Bluetooth connection or link with the peripheral device, and may be used to exchange data and other information with the peripheral device using Bluetooth communications. The application processor subsystem, which may be coupled to the WLAN subsystem by a PCIe bus, may be configured to extract raw audio data from the one or more first data packets. The audio subsystem is configured to encode the raw audio data provided by the application processor subsystem based at least in part on a Bluetooth profile. In some aspects, the Wi-Fi channel may be a wireless channel in a sub-GHz frequency band, a 2.4 GHz frequency band, a 5 GHz frequency band, a 6 GHz frequency band, or a 60 GHz frequency band.

In various implementations, the direct link connected between the audio subsystem and the WLAN subsystem may be based on the PCIe bus architecture. In some instances, the direct link allows the processed raw audio data to be routed from the audio subsystem directly to the WLAN subsystem for transmission to the peripheral device without passing through the application processor subsystem. In this way, audio data to be transmitted to the peripheral device by the WLAN subsystem avoids latencies associated with the host processor (such as program interrupts), and also avoids latencies associated with the TCP/IP stack within or associated with the application processor subsystem.

In some implementations, the WLAN subsystem may be configured to embed the encoded raw audio data into Ethernet frames of a new Ethertype, encapsule the Ethernet frames within one or more second data packets, and transmit the one or more second data packets over a WLAN link to the peripheral device. In some instances, the WLAN subsystem may be configured to transmit the one or more second data packets to the peripheral device via a P2P link, a TDLS link, or a Wi-Fi Direct link.

In some implementations, the wireless communication device may be a smartphone, and the peripheral device may be one or more pairs of earbuds, one or more headphones, or one or more headsets. In some instances, the audio data may be an audio stream associated with one or more of a real-time gaming application, a voice back-channel corresponding to the real-time gaming application, a real-time AR application, a real-time VR application, a real-time AR/VR application, streaming music, or streaming video. In some aspects, the audio data may be latency-sensitive traffic associated with a real-time application executed by the wireless communication device. In some implementations, the first and second data packets are PPDUs that are compliant with the IEEE 802.11 family of wireless communication standards.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Like reference numbers and designations in the various drawings indicate like elements.

DETAILED DESCRIPTION

Figure 1:
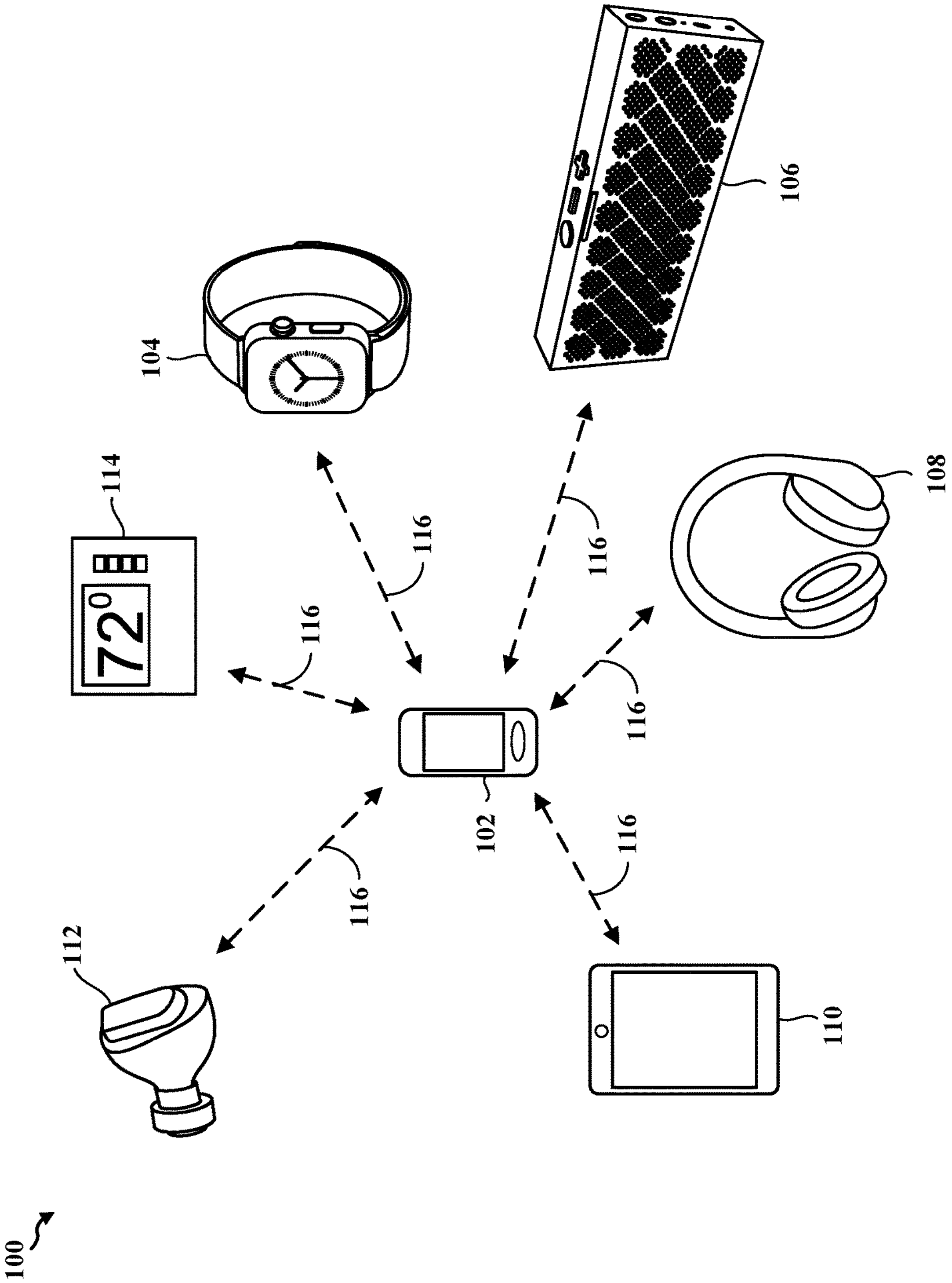
FIG. 1 shows a pictorial diagram of an example Wireless Personal Area Network (WPAN) in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Communicating via traditional Bluetooth and BLE suffer from several limitations that can limit user experiences and negatively affect user experiences. For example, the range of traditional Bluetooth and BLE is limited by a single hop radio frequency (RF) transmission. Additionally, traditional Bluetooth and BLE have limited data capacity, which can have several negative effects on user experience. For example, the limited data capacity of traditional Bluetooth and BLE can result in limited audio quality and/or quality below the needs of the user. Furthermore, traditional Bluetooth and BLE is enabled for radio frequency communication operating within the globally accepted 2.4 GHz Industrial, Scientific & Medical (ISM) band. However, operating only within the 2.4 GHz band can result in devices that are communicating via the Bluetooth and BLE to experience interference from other devices that are communicating wirelessly using other wireless communication technologies. Therefore, to address the foregoing limitations of traditional Bluetooth and BLE, devices may be configured to operate using Bluetooth (BT) over Internet Protocol (BToIP) protocol. The BToIP protocol enables radio frequency communication over a wireless network, such as a wireless local area network (WLAN). Therefore, the BToIP protocol enables radio frequency communication that can operate outside of the 2.4 GHz ISM band. For example, the BToIP protocol enables radio frequency communication operating within the globally accepted 5 GHz frequency band and/or within various unlicensed portions of the 6 GHz frequency band.

In some other implementations, devices may be configured to operate using a Bluetooth (BT) over WLAN (BToWLAN) protocol that allows WLAN-compliant data packets (such as IEEE 802.11-compliant PPDUs) to include encapsulated Ethernet frames carrying encoded audio data intended for one or more associated Bluetooth peripheral devices. The Ethernet frames may be of a new Ethertype indicating that the Ethernet frames carry audio data intended for one or more Bluetooth peripheral devices. The new Ethertype may also signal that the Ethernet frames are non IP-based Ethernet frames that do not need to pass through a TCP/IP stack prior to transmission to the one or more Bluetooth peripheral devices, thereby avoiding latencies associated with the TCP/IP stack.

However, communication over a wireless network such as a WLAN can result in higher power consumption than communicating via traditional Bluetooth and/or BLE protocols. The higher power consumption can negatively affect battery life of a device and may cause the device to be charged more frequently. Therefore, there exists a need for improved power management for devices communicating via the BToIP protocol.

FIG. 1 shows a block diagram of an example WPAN 100 in accordance with certain aspects of the disclosure. Within the WPAN 100, a central device 102 may connect to and establish a BLE communication link 116 with one or more peripheral devices 104, 106, 108, 110, 112, 114 using a BLE protocol or a modified BLE protocol. The BLE protocol is part of the BT core specification and enables radio frequency communication operating within the globally accepted 2.4 GHz Industrial, Scientific & Medical (ISM) band.

The central device 102 may include suitable logic, circuitry, interfaces, processors, and/or code that may be used to communicate with one or more peripheral devices 104, 106, 108, 110, 112, 114 using the BLE protocol or the modified BLE protocol as described herein. The central device 102 may operate as an initiator to request establishment of a link layer (LL) connection with an intended peripheral device 104, 106, 108, 110, 112, 114.

A link layer (LL) in the BLE protocol stack and/or modified BLE protocol stack provides ultra-low power idle mode operation, simpler device discovery, and more reliable point-to-multipoint data transfer with advanced power-save and encryption functionalities, as compared to legacy Bluetooth protocols. After a requested link layer connection is established, the central device 102 may be capable of supporting multiple link layer connections at a time with various peripheral devices 104, 106, 108, 110, 112, 114. The central device 102 may be operable to manage various aspects of data packet communication in a link layer connection with one or more of the associated peripheral devices 104, 106, 108, 110, 112, and 114. For example, the central device 102 may be operable to determine an operation schedule in the link layer connection with a peripheral device 104, 106, 108, 110, 112, 114. The central device 102 may be operable to initiate a link layer protocol data unit (PDU) exchange sequence over the link layer connection. Link layer connections may be configured to run periodic connection events in dedicated data channels. The exchange of link layer data PDU transmissions between the central device 102 and one or more of the peripheral devices 104, 106, 108, 110, 112, 114 may take place within connection events.

In certain configurations, the central device 102 may be configured to transmit the first link layer data PDU in each connection event to an intended peripheral device 104, 106, 108, 110, 112, 114. In certain other configurations, the central device 102 may utilize a polling scheme to poll the intended peripheral device 104, 106, 108, 110, 112, 114 for a link layer data PDU transmission during a connection event. The intended peripheral device 104, 106, 108, 110, 112, 114 may transmit a link layer data PDU upon receipt of packet link layer data PDU from the central device 102. In certain other configurations, a peripheral device 104, 106, 108, 110, 112, 114 may transmit a link layer data PDU to the central device 102 without first receiving a link layer data PDU from the central device 102.

Examples of the central device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, 114 may include a cellular phone, a smart phone, a SIP phone, a STA, a laptop, a PC, a desktop computer, a PDA, a satellite radio, a global positioning system, a multimedia device, a video device, a digital audio player (e.g., MP3 player), a camera, a game console, a tablet, a smart device, a wearable device (e.g., smart watch, wireless headphones, etc.), a vehicle, an electric meter, a gas pump, a toaster, a thermostat, a hearing aid, a blood glucose on-body unit, an IoT device, or any other similarly functioning device. Although the central device 102 is illustrated in communication with six peripheral devices 104, 106, 108, 110, 112, 114 in the WPAN 100, the central device 102 may communicate with more or fewer than six peripheral devices within the WPAN 100 without departing from the scope of the present disclosure.

A device implementing the BT protocol, such as the central device 102, may operate according to one radio mode, such as basic rate (BR)/enhanced data rate (EDR), and a device implementing the BLE protocol may operation according to a BLE radio mode. In some aspects, the central device 102 may be configured with dual radio modes, and therefore may be able to operate according to the BR/EDR mode or the BLE mode, for example, based on the type of short-rage wireless communication in which the device may engage.

For example, the central device 102 may operate according to the BR/EDR mode for continuous streaming of data, for broadcast networks, for mesh networks, and/or for some other applications in which a relatively higher data rate may be more suitable. However, the device may operate according to the BLE mode for short burst data transmissions, such as for some other applications in which power conservation may be desirable and/or a relatively lower data rate may be acceptable. In other aspects, the central device 102 may operate according to one or more other radio modes, including proprietary radio mode(s). Examples of other radio modes may include high speed radio modes, low energy radio modes, isochronous radio modes, etc.

Figure 2:
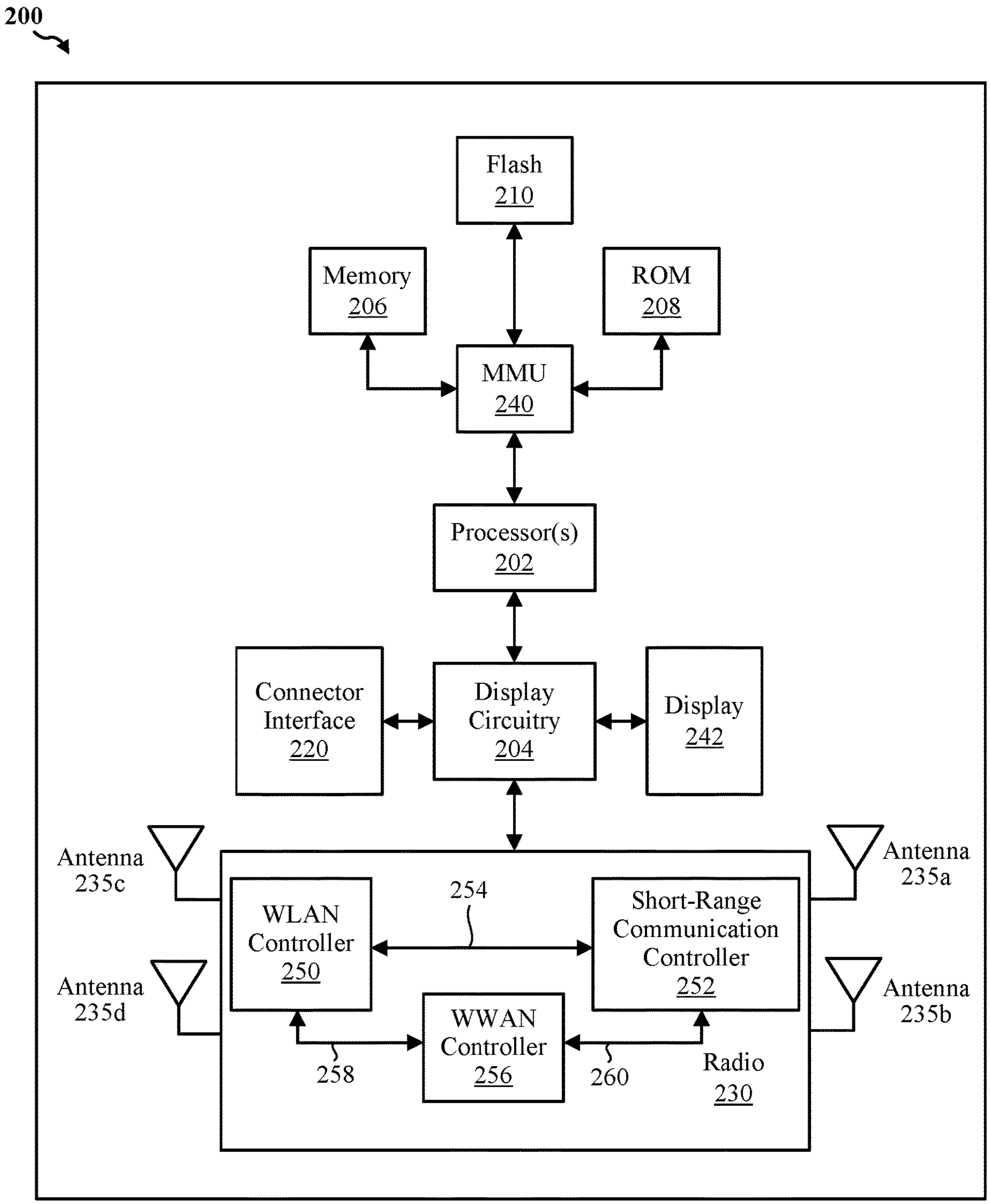
FIG. 2 shows a block diagram of a wireless communication device in accordance with certain aspects of the disclosure.

FIG. 2 is block diagram of a wireless device 200 in accordance with certain aspects of the disclosure. The wireless device 200 may correspond to, e.g., the central device 102, and/or one of peripheral devices 104, 106, 108, 110, 112, 114 described above in connection with FIG. 1. In certain aspects, the wireless device 200 may be a BLE enabled device.

As shown in FIG. 2, the wireless device 200 may include a processing element, such as processor(s) 202, which may execute program instructions for the wireless device 200. The wireless device 200 may also include display circuitry 204 which may perform graphics processing and provide display signals to the display 242. The processor(s) 202 may also be coupled to memory management unit (MMU) 240, which may be configured to receive addresses from the processor(s) 202 and translate the addresses to address locations in memory (e.g., memory 206, ROM 208, Flash memory 210) and/or to address locations in other circuits or devices, such as the display circuitry 204, radio 230, connector interface 220, and/or display 242. The MMU 240 may be configured to perform memory protection and page table translation or set up. In some embodiments, the MMU 240 may be included as a portion of the processor(s) 202.

As shown, the processor(s) 202 may be coupled to various other circuits of the wireless device 200. For example, the wireless device 200 may include various types of memory, a connector interface 220 (e.g., for coupling to the computer system), the display 242, and wireless communication circuitry (e.g., for Wi-Fi, BT, BLE, cellular, etc.). The wireless device 200 may include a plurality of antennas 235*a*, 235*b*, 235*c*, 235*d*, for performing wireless communication with, e.g., wireless devices in a WPAN.

In certain aspects, the wireless device 200 may include hardware and software components (a processing element) configured to adjust wakeup time interval and shutdown time for the device, e.g., using the techniques described herein. The wireless device 200 may also include BT and/or BLE firmware or other hardware/software for controlling BT and/or BLE operations.

The wireless device 200 may be configured to implement part or all of the techniques described herein by executing program instructions stored on a memory medium (e.g., a non-transitory computer-readable memory medium) and/or through hardware or firmware operation. In other embodiments, the techniques described herein may be at least partially implemented by a programmable hardware element, such as an field programmable gate array (FPGA), and/or an application specific integrated circuit (ASIC).

In certain aspects, radio 230 may include separate controllers configured to control communications for various respective radio access technology (RAT) protocols. For example, as shown in FIG. 2, radio 230 may include a WLAN controller 250 configured to control WLAN communications, a short-range communication controller 252 configured to control short-range communications, and a WWAN controller 256 configured to control WWAN communications. In certain aspects, the wireless device 200 may store and execute a WLAN software driver for controlling WLAN operations performed by the WLAN controller 250, a short-range communication software driver for controlling short-range communication operations performed by the short-range communication controller 252, and/or a WWAN software driver for controlling WWAN operations performed by the WWAN controller 256.

In certain implementations, a first coexistence interface 254 (e.g., a wired interface) may be used for sending information between the WLAN controller 250 and the short-range communication controller 252. In certain other implementations, a second coexistence interface 258 may be used for sending information between the WLAN controller 250 and the WWAN controller 256. In certain other implementations, a third coexistence interface 260 may be used for sending information between the short-range communication controller 252 and the WWAN controller 256.

In some aspects, one or more of the WLAN controller 250, the short-range communication controller 252, and/or the WWAN controller 256 may be implemented as hardware, software, firmware or some combination thereof.

In certain configurations, the WLAN controller 250 may be configured to communicate with a second device in a WPAN using a WLAN link using all of the antennas 235*a*, 235*b*, 235*c*, 235*d*. In certain other configurations, the short-range communication controller 252 may be configured to communicate with at least one second device in a WPAN using one or more of the antennas 235*a*, 235*b*, 235*c*, 235*d*. In certain other configurations, the WWAN controller 256 may be configured to communicate with a second device in a WPAN using all of the antennas 235*a*, 235*b*, 235*c*, 235*d*. The WLAN controller 250, the short-range communication controller 252, and/or the WWAN controller 256 may be configured to adjust wakeup time interval and shutdown time for the device.

Figure 3:
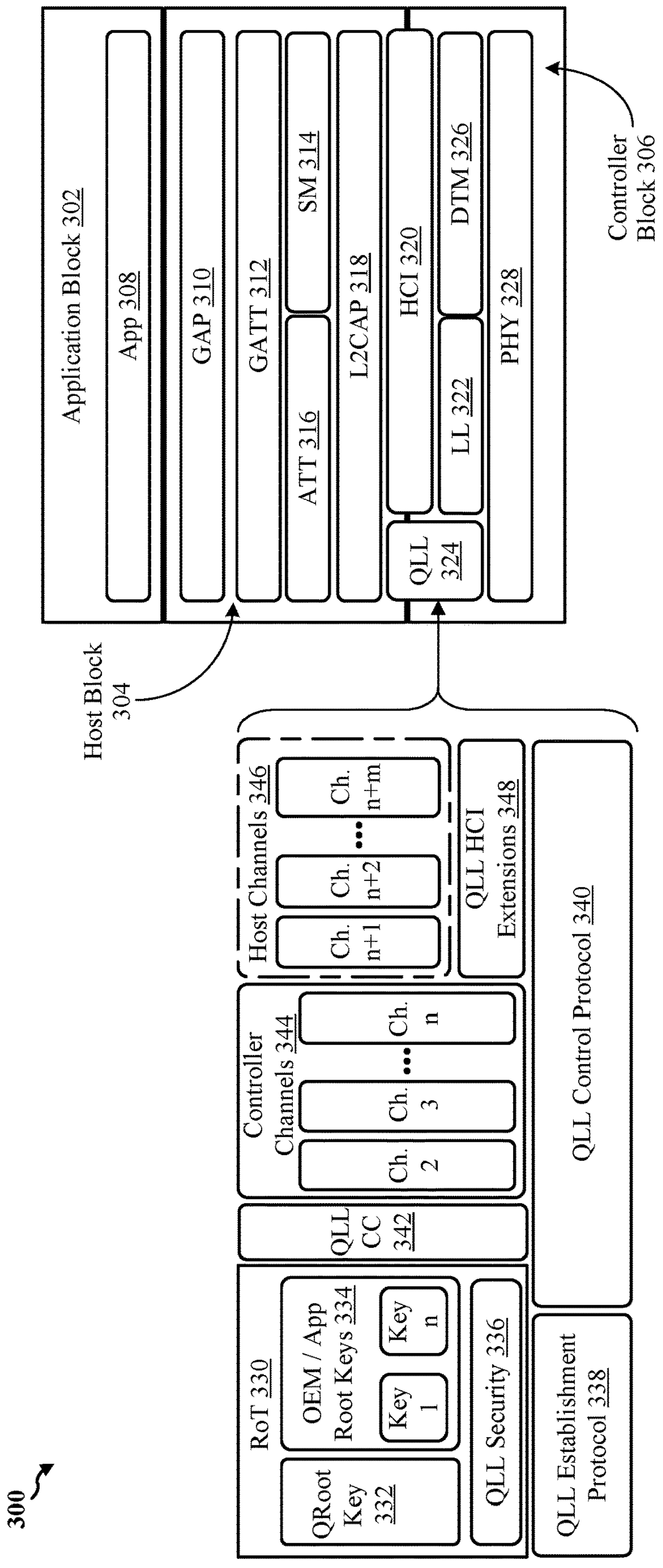
FIG. 3 shows a block diagram of a modified Bluetooth Low Energy (BLE) protocol stack in accordance with certain aspects of the disclosure.

FIG. 3 illustrates a modified BLE protocol stack 300 that may be implemented in a BLE device in accordance with certain aspects of the present disclosure. For example, the modified BLE protocol stack 300 may be implemented by one or more of processor(s) 202, memory 206, Flash memory 210, ROM 208, the radio 230, and/or the short-range communication controller 252 illustrated in FIG. 2.

Referring to FIG. 3, the modified BLE protocol stack 300 may be organized into three blocks, namely, the Application block 302, the Host block 304, and the Controller block 306. Application block 302 may be a user application which interfaces with the other blocks and/or layers of the modified BLE protocol stack 300. The Host block 304 may include the upper layers of the modified BLE protocol stack 300, and the Controller block 306 may include the lower layers of the modified BLE protocol stack 300.

The Host block 304 may communicate with a controller (e.g., short-range communication controller 252 of FIG. 2) in a wireless device using a Host Controller Interface (HCI) 320. The HCI 320 may also be used as an interface between the Controller block 306 and the Host block 304. Interfacing the Controller block 306 and the Host block 304 may enable a wide range of Hosts to interface with the Controller block 306.

The Application block 302 may include a higher-level Application Layer (App) 308, and the modified BLE protocol stack 300 may run under the App 308. The Host block 304 may include a Generic Access Profile (GAP) 310, a Generic Attribute Protocol (GATT) 312, a Security Manager (SM) 314, an Attribute Protocol (ATT) 316, and a Logical Link Control and Adaptation Protocol (L2CAP) 318, each of which are described in further detail below. The Controller block 306 may include a link layer 322, a proprietary link layer (QLL) 324, a Direct Test Mode (DTM) 326, and a Physical Layer (PHY) 328, each of which are described in further detail below.

To support future applications (e.g., IoT applications, audio applications, etc.), the PHY 328 of the present disclosure may support an increased range of communication and data rate as compared to the PHY in a traditional BLE protocol stack. The PHY 328 may define the mechanism for transmitting a bit stream over a physical link that connects BLE devices. The bit stream may be grouped into code words or symbols, and converted to a PDU that is transmitted over a transmission medium. The PHY 328 may provide an electrical, mechanical, and procedural interface to the transmission medium. The shapes and properties of the electrical connectors, the frequency band used for transmission, the modulation scheme, and similar low-level parameters may be specified by the PHY 328.

The DTM 326 may allow testing of the PHY 328 by transmitting and receiving sequences of test packets. DTM 326 may be used in compliance and production-line testing without the need of going through the entire modified BLE protocol stack 300. In other words, the DTM 326 may skip the Host block 304 and communicate directly with the short-range communications controller of the radio (e.g., the short-range communication controller 252 and radio 230 in FIG. 2) in an isolated manner.

The link layer 322 may be responsible for low level communication over the PHY 328. The link layer 322 may manage the sequence and timing of transmitted and received link layer data PDUs, and using a link layer protocol, communicate with other devices regarding connection parameters and data flow control. The link layer 322 may provide gate keeping functionality to limit exposure and data exchange with other devices. If filtering is configured, the link layer 322 may maintain a list of allowed devices and ignore all requests for data PDU exchange from devices not on the list. The link layer 322 may use the HCI 320 to communicate with upper layers of the modified BLE protocol stack 300. In certain aspects, the link layer 322 may be used to generate a link layer data PDU and/or an empty packet (e.g., empty PDU) that may be transmitted using a link layer communication link established with another BLE device using the link layer 322.

The QLL 324 is a proprietary protocol that exists alongside the link layer 322. The QLL 324 may be used to discover peer proprietary devices, and establish a secure communication channel therewith. For example, the QLL 324 may be used to establish a QLL communication link between short-range communication controllers and/or proprietary controllers (not shown in FIG. 2) in two wireless devices, e.g., two Qualcomm® devices, two Apple® devices, two Samsung® devices, etc., The proprietary controllers in peer proprietary devices may communicate with each other using allocated channels, a control protocol, attributes, and procedures. Proprietary controllers may either establish a QLL communication link after a standard connection at the link layer 322 has been established or over an advertising bearer. Once a QLL communication link has been established at the QLL 324, the proprietary controllers of two peer proprietary devices may be able to communicate with each other using a set of dedicated channels. Each service available at a proprietary controller may be associated with a particular channel number. A proprietary controller may include up to or more than, e.g., 127 different services. The services may include, e.g., firmware updates, licensing additional codes, and/or adding additional firmware components on peer devices just to name a few.

The Root of Trust (RoT) 330 may provide a set functions that are always trusted by a proprietary device's operating system (OS). The RoT 330 may control a trusted computing platform cryptographic processor at a proprietary device. The QRoot key 332 may include a shared key that may be used for communication with other proprietary devices. The QRoot key 332 may be used to indicate that a device is a QLL supporting device.

The original equipment manufacturer (OEM)/App root keys 334 may include a shared key that may be used for communication with other devices that support a specific OEM or a specific App. In certain configurations, after a device is sold different functionality related to the QLL, a specific OEM, and/or a specific App may be enabled by "turning on" specific keys maintained at the QRoot key 332 and/or the OEM/App root keys 334. The QLL security 336 may include a set of security algorithms that may be used to enable authentication of other proprietary devices based on the QRoot key 332 and/or the OEM/App root keys 334.

The QLL Establishment Protocol 338 may establish a QLL communication link with a peer proprietary device using a connection establishment bearer or an advertising establishment bearer. The QLL Control Protocol 340 may serve as a QLL channel multiplexer for the QLL communication link. The QLL Control Protocol 340 may also define the QLL control PDUs and QLL control procedures used to manage the QLL logical channels. The QLL Control Protocol 340 may define a set of QLL Control PDUs available to all channels and permit each QLL channel to define channel-specific QLL Control PDUs and procedures.

All QLL communication links may support a QLL control channel (CC) 342 (e.g., channel 1). The QLL CC 342 may be used to perform QLL service discovery to identify a peer proprietary controller, determine other QLL channels, and determine QLL features supported between two proprietary controllers. The QLL CC 342 may also be used to terminate the QLL communication link.

The Controller Channels 344 (e.g., channel 2 . . . channel n) may be used to enable different functionality in the controller (e.g., short-range communication controller 252, proprietary controller, Controller block 306, etc.) to be multiplexed between two or more proprietary devices. For example, the Controller Channels 344 may enable power control updates or codec updates to be performed by an exchange of information between two or more proprietary devices using the Controller Channels 344.

The Host Channels 346 (e.g., channel n+1, channel n+2 . . . channel n+m) may be used to enable different functionality in the Host block 304 to be multiplexed between two or more proprietary devices. For example, the Host Channels 346 may enable updates to Host protocols (e.g., such as music channel control) to be performed by an exchange of information between two or more proprietary devices using the Host Channels 346.

The QLL HCI Extensions 348 may be used to enable communication between the Host block 304 and a controller (e.g., short-range communication controller, proprietary controller, Controller block, etc.) of another proprietary device.

The L2CAP 318 may encapsulate multiple protocols from the upper layers into a link layer data PDU and/or a QLL establishment PDU (and vice versa). The L2CAP 318 may also break large link layer data PDUs and/or a QLL establishment PDUs from the upper layers into segments that fit into a maximum payload size (e.g., 27 bytes) on the transmit side. Similarly, the L2CAP 318 may receive multiple link layer data PDUs and/or QLL establishment PDUs that have been segmented, and the L2CAP 318 may combine the segments into a single link layer data PDU and/or a QLL establishment PDU that may be sent to the upper layers.

The ATT 316 may be a client/server protocol based on attributes associated with a BLE device configured for a particular purpose (e.g., monitoring heart rate, monitoring temperature, broadcasting advertisements, etc.). The attributes may be discovered, read, and written by other BLE enabled devices. The set of operations which are executed over ATT 316 may include, but are not limited to, error handling, server configuration, find information, read operations, write operations, queued writes, etc. The ATT 316 may form the basis of data exchange between BLE devices.

The SM 314 may be responsible for device pairing and key distribution. A security manager protocol implemented by the SM 314 may define how communications with the SM of a counterpart BLE deice are performed. The SM 314 may provide additional cryptographic functions that may be used by other components of the modified BLE protocol stack 300. The architecture of the SM 314 used in BLE may be designed to minimize recourse requirements for peripheral devices by shifting work to a central device. The SM 314 provides a mechanism to not only encrypt the data but also to provide data authentication.

The GATT 312 describes a service framework using the attribute protocol for discovering services, and for reading and writing characteristic values on a counterpart BLE device. The GATT 312 interfaces with the App 308 through the App's profile. The App 308 profile defines the collection of attributes and any permission associated with the attributes to be used in BLE communications. One of the benefits of BT technology is device interoperability. To assure interoperability, using a standardized wireless protocol to transfer bytes of information may be inadequate, and hence, sharing data representation levels may be needed. In other words, BLE devices may send or receive data in the same format using the same data interpretation based on intended device functionality. The attribute profile used by the GATT 312 may act as a bridge between the modified BLE protocol stack and the application and functionality of the BLE device (e.g., at least from a wireless connection point of view), and is defined by the profile.

The GAP 310 may provide an interface for the App 308 to initiate, establish, and manage connection with counterpart BLE devices. The GAP 310 may indicate the modes and access procedures used by the transports, protocols and application profiles. GAP services include device discovery, connection modes, security, authentication, association models and service discovery. Specifically, for Basic Rate (BR) and Extended Data Rate (EDR) devices, the GAP defines a single role with functionality that may be present in each device. This functionality includes how devices discovery each other, establish connections and describes security association models used for authentication. For BLE devices, the GAP defines four specific roles: Broadcaster, Observer, Peripheral, and Central. The Broadcaster role is optimized for transmitter only applications, and does not support connections. Devices supporting the Broadcaster role use advertising to broadcast data. The Observer role is optimized for receiver only applications, and does not support connections. Devices supporting the Observer role are the complementary device for a Broadcaster, and receive broadcast data contained in advertisements. The Peripheral role is optimized for devices that support a single connection and are less complex than the Central role (e.g., by using the Link Layer Peripheral role within the connection). The Central role supports multiple connections, and is the initiator for all connections with devices in the Peripheral role. Both the Peripheral role and the Central role use the Link Layer Central role within the connection.

Figure 4A:
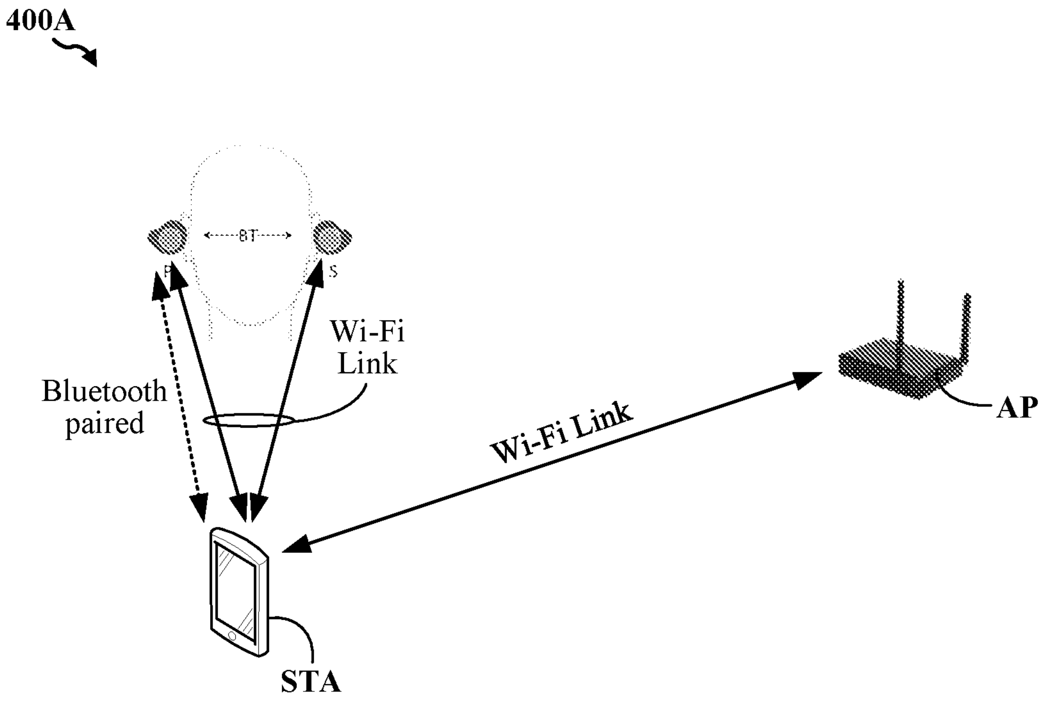
FIGS. 4A-4G show example topologies of a wireless network.

FIGS. 4A-4G illustrate various example network topologies of wireless communication devices communicating via a BToIP protocol. For example, FIG. 4A shows a network topology 400A in which a STA is associated with an AP, and may exchange data and other information with the AP over one or more Wi-Fi channels using frames or packets compliant with the IEEE 802.11 family of wireless communication standards. The STA has an active Bluetooth connection with a pair of earbuds 410 (e.g., such that the STA and earbuds 410 are "paired"), and may send data and other information to the earbuds 410 using frames or packets defined by the Bluetooth and BLE protocols. In some implementations, the STA may also send data and other information to the earbuds 410 as Ethernet frames encapsulated within frames or packets that are compliant with the IEEE 802.11 family of wireless communication standards, thereby allowing the STA to send data and other information to the earbuds 410 over the one or more Wi-Fi channels (rather than using Bluetooth frequency hopping techniques limited to the 2.4 GHz frequency band). In some instances, the STA may be associated with or implement a softAP that operates on the one or more Wi-Fi channels, and the earbuds 410 may be clients of the softAP. That is, the earbuds 410 may be associated with the softAP, which may allow the earbuds 410 to communicate directly with the STA using Wi-Fi communications rather than Bluetooth communications.

Figure 4B:
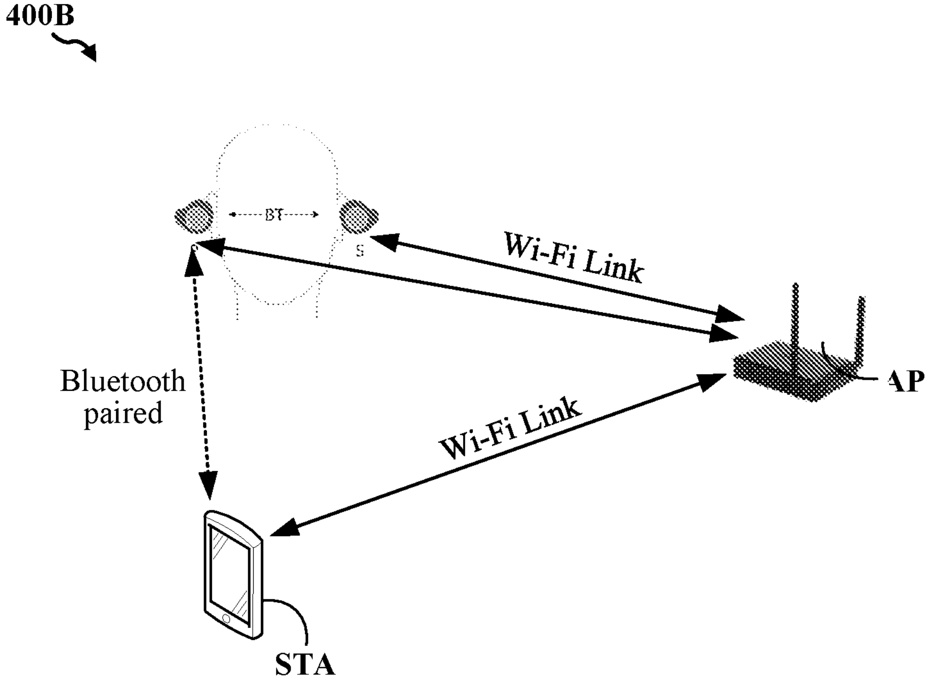

FIG. 4B shows another network topology 400B in which the STA is associated with the AP, and can therefore exchange data and other information with the AP over one or more Wi-Fi channels using IEEE 802.11-compliant frames or packets. As in FIG. 4A, the STA has an active Bluetooth connection with the earbuds 410, and may therefore send data and other information to the earbuds 410 using Bluetooth or BLE frames or packets. However, while the earbuds 410 of FIG. 4A are associated with the STA and can receive audio data over one or more Wi-Fi channels from the STA, the earbuds 410 of FIG. 4B are associated with the AP, and therefore can receive audio data over the one or more Wi-Fi channels from the AP (but not from the STA).

Figure 4C:
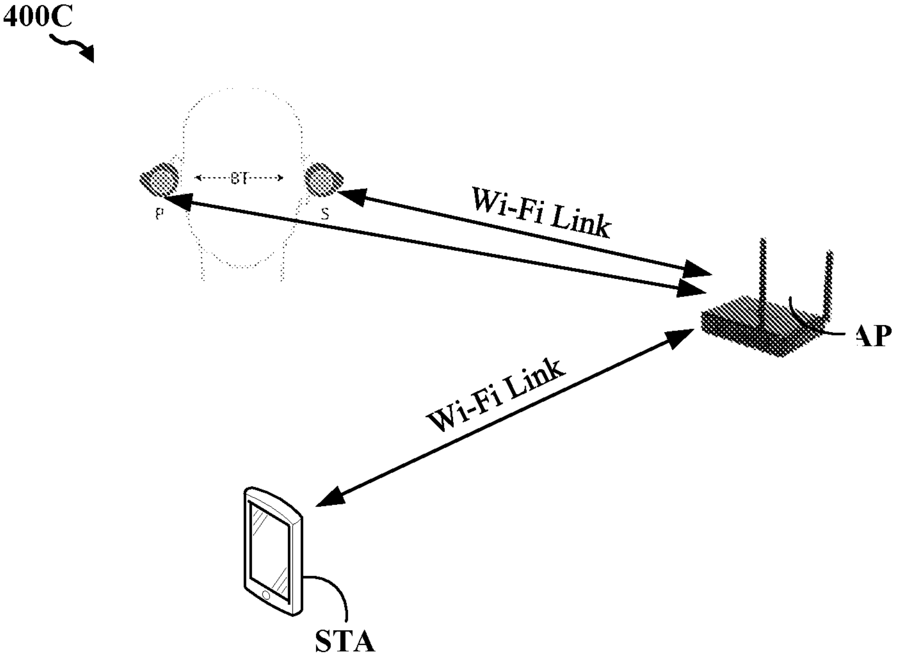

FIG. 4C shows another network topology 400C in which the STA is associated with the AP, and can therefore exchange data and other information with the AP over one or more Wi-Fi channels using IEEE 802.11-compliant frames or packets. As in FIG. 4B, the earbuds 410 are associated with the AP, and therefore can receive audio data over the one or more Wi-Fi channels from the AP (but not from the STA). However, in contrast to the example of FIG. 4B, there is not an active Bluetooth session or connection between the earbuds 410 and the STA in FIG. 4C, and therefore the STA may not be able to communicate with the earbuds 410 over Wi-Fi channels or over a Bluetooth connection.

Figure 4D:
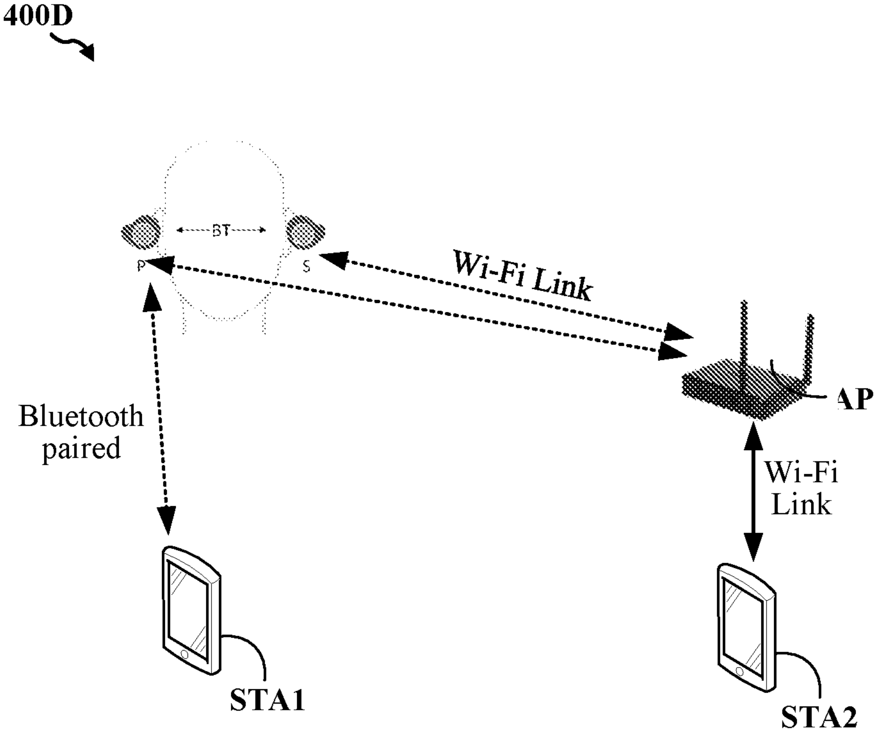

FIG. 4D shows another network topology 400D that includes an AP, two wireless stations STA1-STA2, and the earbuds 410. Here, STA1 and the earbuds 410 are connected to each other via an active Bluetooth session or connection, and can therefore exchange Bluetooth frames or packets with each other. Also, STA2 is associated with the AP, and can therefore exchange data and other information with the AP over one or more Wi-Fi channels using IEEE 802.11-compliant frames or packets. The earbuds 410 are also associated with the AP, and therefore can receive audio data over the one or more Wi-Fi channels from the AP (but not from STA1 or STA2).

Figure 4E:
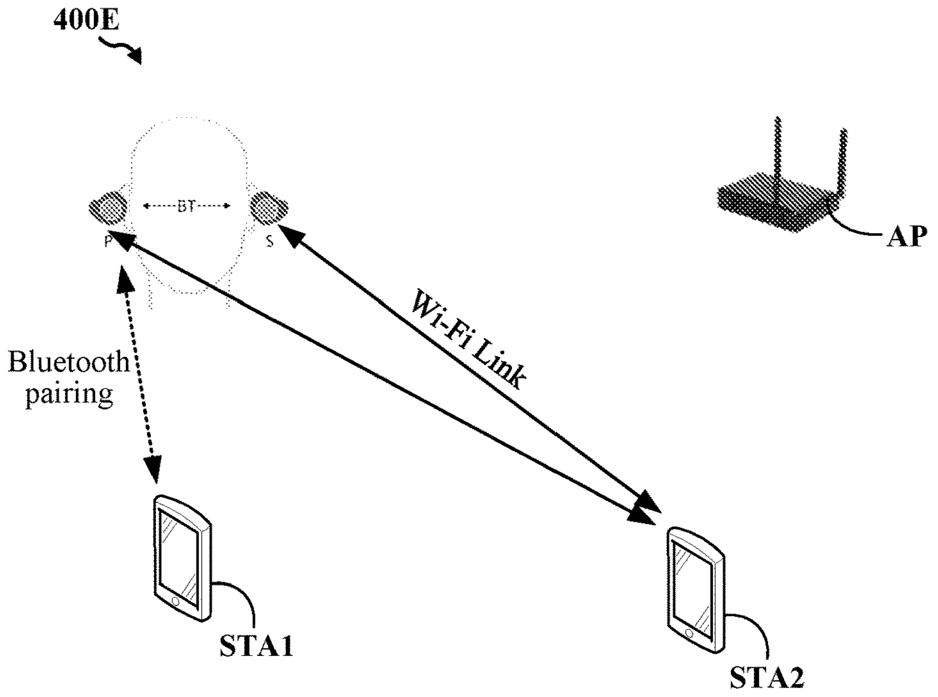

FIG. 4E shows another network topology 400E that includes an AP, two wireless stations STA1-STA2, and the earbuds 410. The network topology 400E is similar to the network topology 400D of FIG. 4D, except that the earbuds 410 are associated with STA2 rather than the AP. As such, the earbuds 410 can receive audio data from STA2 over one or more Wi-Fi channels using IEEE 802.11-compliant frames or packets.

Figure 4F:
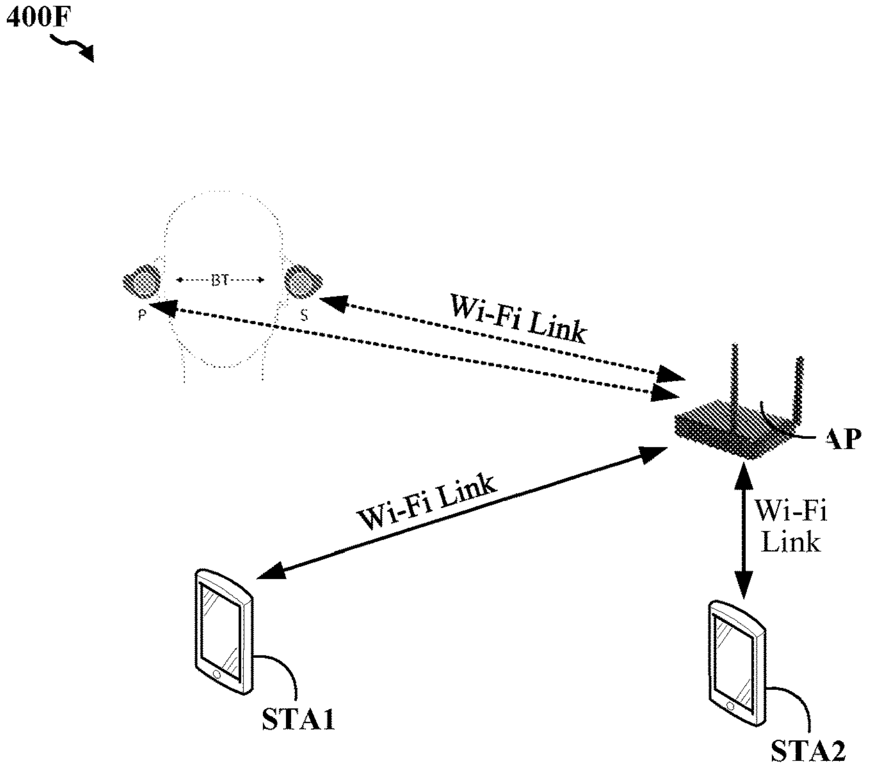

FIG. 4F shows another network topology 400F that includes an AP, two wireless stations STA1-STA2, and the earbuds 410. The network topology 400F is similar to the network topology 400D of FIG. 4D, except that STA1 is also associated with the AP, and can therefore exchange data and other information with the AP over one or more Wi-Fi channels using IEEE 802.11-compliant frames or packets.

Figure 4G:
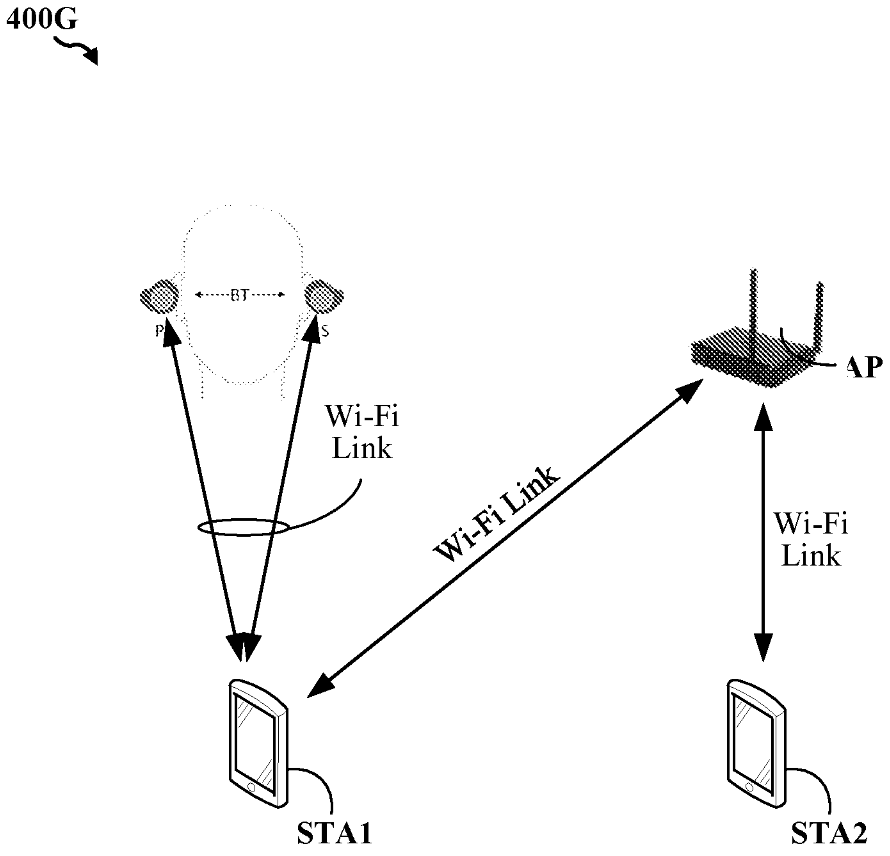

FIG. 4G shows another network topology 400G that includes an AP, two wireless stations STA1-STA2, and the earbuds 410. The network topology 400G is similar to the network topology 400F of FIG. 4F, except that the earbuds 410 are associated with STA1 rather than with the AP. As such, STA1 and the earbuds 410 can exchange data and other information with each other over one or more Wi-Fi channels using IEEE 802.11-compliant frames or packets. Also, because both STA1 and STA2 are associated with the AP, the network topology 400G may provide dual Bluetooth over Wi-Fi links for the earbuds 410, for example, that can allow the earbuds 410 to receive audio data over one or more Wi-Fi channels from STA1 and/or STA2 using IEEE 802.11-compliant frames or packets.

Figure 5:
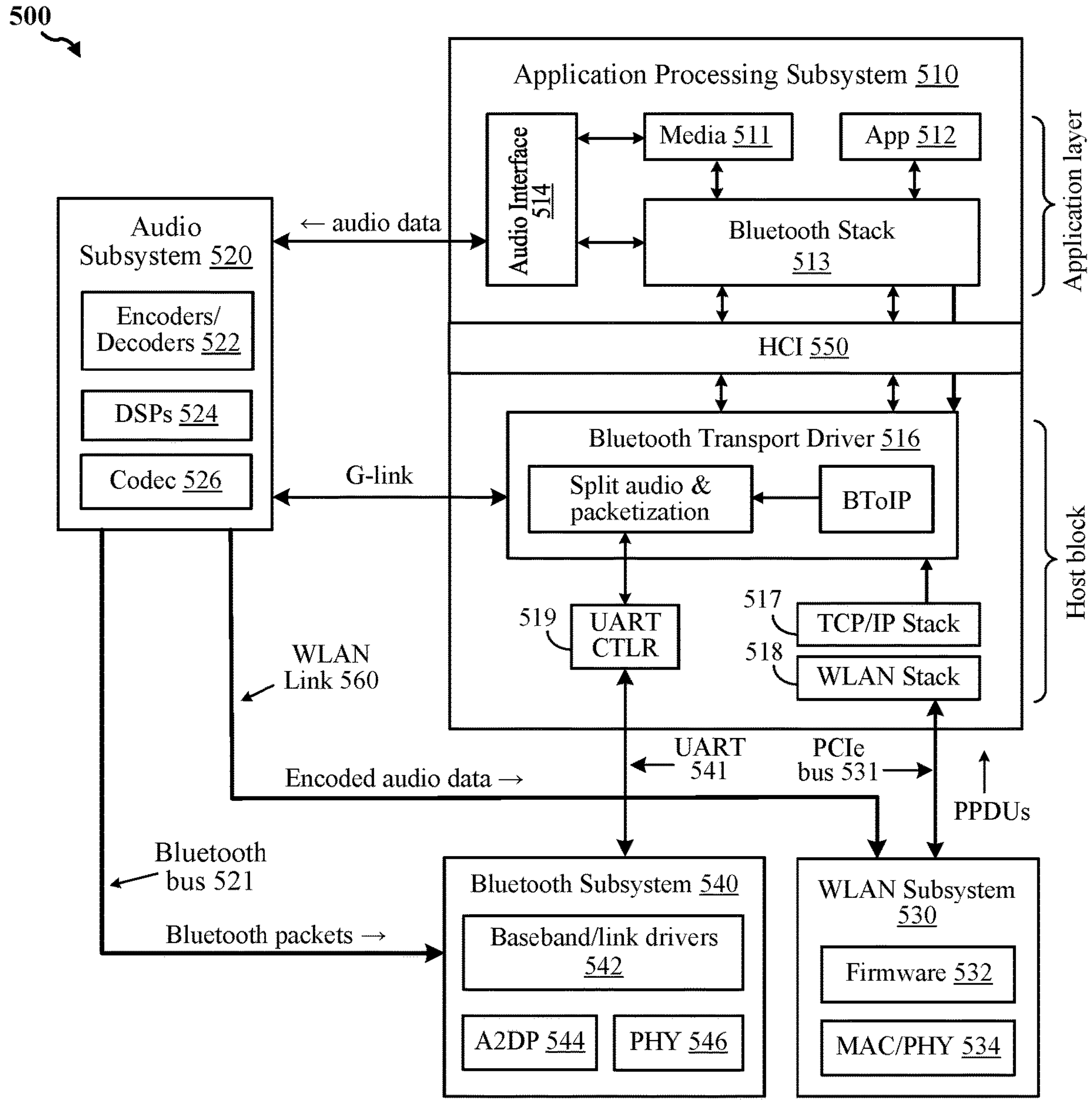
FIG. 5 shows a block diagram of an example wireless communication device.

FIG. 5 is block diagram of a wireless communication device 500 in accordance with certain aspects of the disclosure. In some implementations, the wireless communication device 500 may be an example of the central device 102 described with reference to FIG. 1. In some instances, the wireless communication device 500 may be a BLE enabled device. In some other instances, the wireless communication device 500 can operate as a STA that is associated with an AP while also operating as a softAP connected to or paired with one or more peripheral devices based on one or more Bluetooth protocols.

The wireless communication device 500 may include one or more of an application processing subsystem 510, an audio subsystem 520, a WLAN subsystem 530, a Bluetooth subsystem 540, a Host Controller Interface (HCI) 550, and a WLAN link 560. In various implementations, the application processing subsystem 510 may correspond to the application layer and the Host block of the modified BLE protocol stack 300 of FIG. 3. In some instances, the application layer may include a media player 511, an Application Layer (App) 512, a Bluetooth stack 513, and an audio interface 514. The media player 511 can be suitable device or component capable of generating or receiving multimedia content including, for example, latency-sensitive traffic, real-time audio streams, real-time video streams, real-time gaming streams, and so on. The App 512, which may be one implementation of the App 308 of FIG. 3, includes a profile that defines the collection of attributes and any associated permissions to be used in BLE communications. In some aspects, the App 512 may include (or may be associated with) processing resources including (but not limited to) the memory 206, the ROM 208, and the Flash memory 210 of FIG. 2. The Bluetooth stack 513 may be one implementation of the modified BLE protocol stack 300 of FIG. 3.

The Host block may include a Bluetooth transport driver 516, a TCP/IP stack 517, a WLAN stack 518, and a UART controller 519. The Bluetooth transport driver 516 may include a split audio and packetization module and a BToIP module responsible for formatting audio data into Bluetooth frames that can be encapsulated within IEEE 802.11-compliant PPDUs to be transmitted to the peripheral device. The TCP/IP stack 517 allows the wireless communication device 500 to exchange data and control information with corresponding layers of a TCP/IP stack implemented in another wireless communication device. For example, the TCP/IP stack 517 may be used to format frames or packets for transmission using the TCP/IP transmission protocol, and may be used to extract data (such as audio data) from received frames or packets.

The WLAN stack 518 allows the wireless communication device 500 to exchange data and control information with corresponding layers of a WLAN stack implemented in another wireless communication device. For example, the WLAN stack 518 may be used to format frames or packets for transmission based on the IEEE 802.11 family of wireless communication standards, and may be used to extract data (such as audio data) from received frames or packets.

In some implementations, the WLAN stack 518 may be coupled to the WLAN subsystem 530 through a PCIe bus 531, and may operate in conjunction with the TCP/IP stack 517. In some instances, the WLAN stack 518, the TCP/IP stack 517, and the UART controller 519 may correspond to a Kernel space of the application processing subsystem 510. The UART 541, which is managed by the UART controller 519, provides a 3-wire interface (e.g., a transmit wire, a receive wire, and a ground wire) between the application processing subsystem 510 and the Bluetooth subsystem 530.

The audio subsystem 520 may include encoders/decoders 522, one or more digital signal processors (DSPs) 524, and one or more codecs 526. The encoders/decoders 522 may be used to sample audio data that was extracted from one or more PPDUs received over the Wi-Fi channel and then processed in the application processing block 510 based at least in part on a Bluetooth profile. In some implementations, the encoders/decoders 522 may partition the sampled audio data into Bluetooth payloads that can be embedded within one or more Bluetooth packets for transmission to the peripheral device over a Bluetooth or BLE connection. In some other implementations, the encoders/decoders 522 may partition the sampled audio data into audio frames or packets that can be encapsulated within IEEE 802.11-compliant PPDUs for transmission to the peripheral device over a Wi-Fi link or channel. In some instances, the DSPs 524 and/or the codecs 526 may employ one or more encoding or decoding algorithms in conjunction with sampling the audio data.

The WLAN subsystem 530 may include WLAN firmware 532 and a WLAN MAC/PHY 534. The WLAN firmware 532 controls operations of the WLAN subsystem 530, and may provide or determine the protocol and configuration of the WLAN MAC/PHY 534. The WLAN MAC/PHY 534 includes IEEE 802.11-compliant MAC and PHY layers that are collectively responsible for embedding Tx data into MAC frames for transmission over the Wi-Fi channel encapsulated in data packets (such as UL PPDUs or TB PPDUs), and for receiving data packets (such as DL PPDUs) and decoding the data carried or embedded within MAC frames encapsulated in the received PPDUs. For example, when the WLAN subsystem 530 is in a receiving mode, the PHY may be used to receive, demodulate, and down-convert the PPDUs received over the Wi-Fi channel, and the MAC layer may be used to decode data encapsulated in the received PPDUs. The MAC layer may also be used to forward the resulting data units to the application layer via the HCI 550. When the WLAN subsystem 530 is in a transmitting mode, the MAC layer may be used to construct and format MAC frames to carry data received from the upper layers, and the PHY may encapsulate the MAC frames within one or more PPDUs for transmission over the Wi-Fi channel. In some aspects, the PHY may define the mechanism for transmitting a bit stream over a Bluetooth link or connection. For example, the bitstream may be grouped into codewords or symbols, and then converted to a data packet that can be transmitted over the Wi-Fi channel.

The Bluetooth subsystem 540 may include baseband/link drivers 542, an advanced audio distribution profile (A2DP) circuit 544, a PHY 546. The baseband/link drivers 542 may be used to generate baseband signals for constructing and deconstructing data frames. The baseband/link drivers 542 may also be used to generate carrier signals for up-converting baseband signals during data transmissions and for down-converting received data signals to baseband. The A2DP circuit 544 may be used to control or manage an A2DP link between the wireless communication device 500 and a peripheral device (such as the pair of earbuds depicted in FIGS. 4A-4G). With an A2DP link, data packets including audio may be transmitted over an ACL data channel. Other information, such as information for controlling the audio stream, may be transmitted over a separate control channel.

During a receiving mode, the PHY 546 can be used to receive, demodulate, and down-convert data packets received over a Bluetooth link or connection, and forward the data packets to the application processing subsystem 510. During a transmitting mode, the PHY 546 can be used to encapsulate MAC data provided from the upper layers into one or more Bluetooth fames or packets.

The HCI 550 may operate as a boundary between the upper and lower layers of the BLE protocol stack. The HCI 550 may also provide an interface through which the Host block communicates with the Bluetooth transport driver 516.

The WLAN link 560 is connected between the audio subsystem 520 and the WLAN subsystem 530, and may provide a direct link over which Bluetooth-encoded audio data can be sent from the audio subsystem 520 to the WLAN subsystem 530 without passing through or accessing the application processing subsystem 510. Specifically, the WLAN link 560 allows the Bluetooth-encoded audio data to be forwarded directly to the WLAN subsystem 530 for transmission over a Wi-Fi link or channel to the peripheral device without consuming unnecessary processing cycles of the application processor, thereby not only avoiding latencies associated with the application processor but also avoiding latencies associated with the TCP/IP stack 517. In this way, using the WLAN link 560 to directly route Bluetooth-encoded audio data from the audio subsystem 520 to the WLAN subsystem 530 may reduce jitter and latencies associated with sending Bluetooth-encoded audio data to the peripheral device over the Wi-Fi link or channel. In addition, routing the Bluetooth-encoded audio data directly from the audio subsystem 520 to the WLAN subsystem 530 without passing through the application processing subsystem 510 may reduce power consumption of the application processor.

Figure 6:
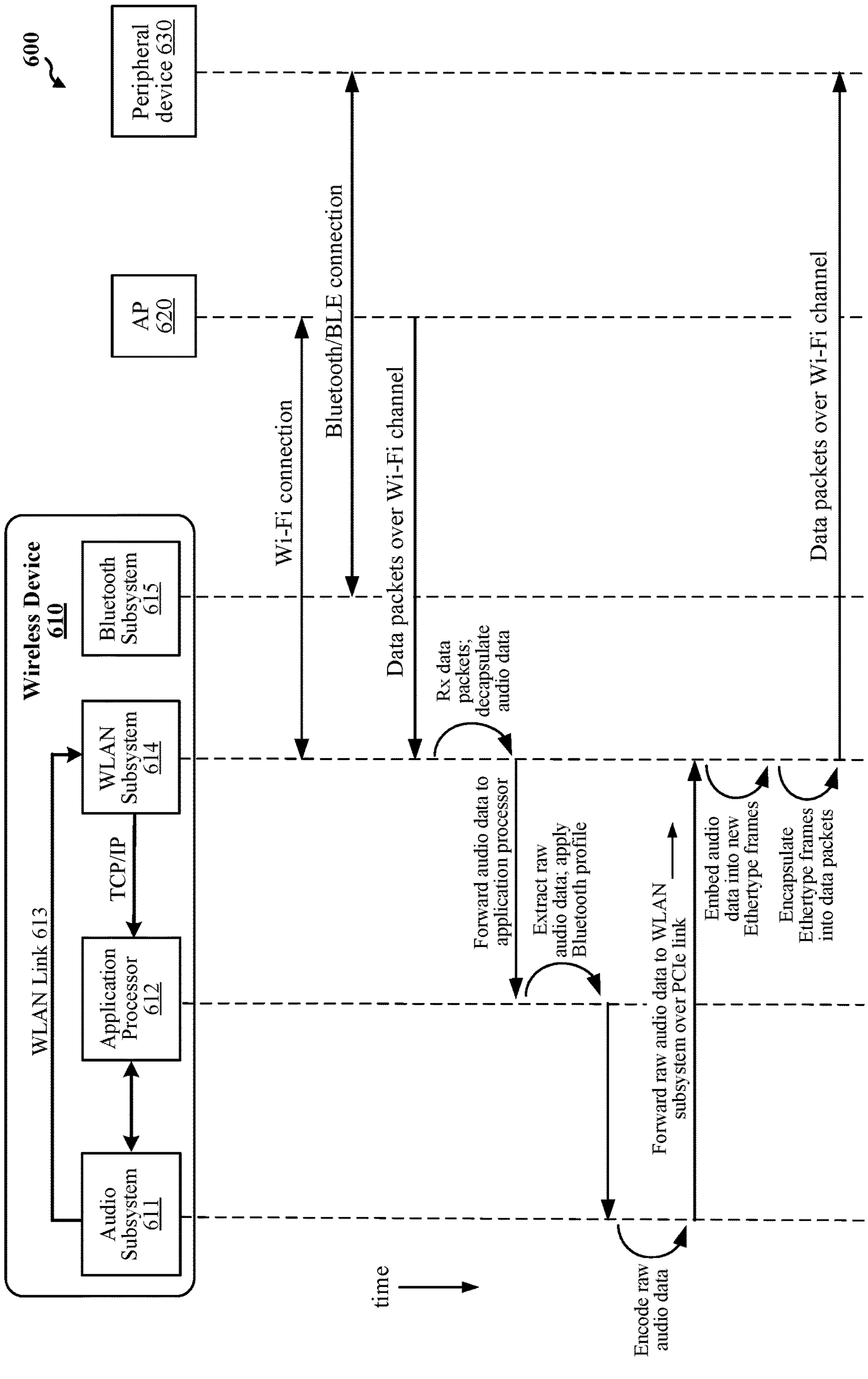
FIG. 6 shows a sequence diagram depicting an example wireless communication that supports transmitting Bluetooth audio data over a Wi-Fi link.

FIG. 6 shows a sequence diagram depicting an example wireless communication 600 that supports transmitting Bluetooth audio data to a peripheral device over a Wi-Fi link. In some implementations, the wireless communication 600 may be performed between a wireless communication device 610, an AP 620, and a peripheral device 630. The AP 620 may be any suitable access point or access terminal that can operate a basic service set (BSS) on a wireless medium. The wireless communication device 610 may be an example of the central device 102 described with reference to FIG. 1, and the peripheral device may be an example of one or more of the peripheral devices 104, 106, 108, 110, 112, or 114 described with reference to FIG. 1. In some instances, the peripheral device may be one or more pairs of earbuds, one or more headphones, or one or more headsets.

In various implementations, the wireless communication device 610 may be associated with the AP 620, and the peripheral device 630 may be paired with or otherwise connected to the wireless communication device 610. In some instances, the wireless communication device 610 operates as a STA that is associated with the AP 620 while also operating as a softAP connected to or paired with the peripheral device 630. In some aspects, the softAP may be paired with the peripheral device 630 based on a Bluetooth or BLE protocol, and may exchange data and other information with the peripheral device 630 over a Bluetooth or BLE connection between the wireless communication device 610 and the peripheral device 630.

In some implementations, the AP 620 and the wireless communication device 610 may exchange and/or negotiate operating channels, capabilities, parameters, and other attributes with each other during association, and establish a Wi-Fi connection (such as a link or a channel) between them. Similarly, the wireless communication device 610 may pair with the peripheral device 630 and establish a Bluetooth or BLE connection between the devices. As such, for purposes of discussion herein, it is assumed that the wireless communication device 610 and the peripheral device 630 are already paired and have established a Bluetooth session. Thus, device discovery operations, service discovery operations, Bluetooth profiles, and other well-known aspects of negotiating, setting up, and maintaining Bluetooth sessions between wireless devices are not described herein.

In some implementations, the wireless communication device 610 may include at least an audio subsystem 611, an application processor 612, a WLAN link 613, a WLAN subsystem 614, and a Bluetooth subsystem 615. Other components of the wireless communication device 610 are omitted from FIG. 6 for simplicity. In some instances, the application processor 612 may be part of the application processing subsystem 510 of FIG. 5, and may be used to extract raw audio data from audio packets provided by the WLAN subsystem 614. For example, the application processor 612 may include various components described with reference to FIG. 5 including, for example, the media player 511, the App 512, the Bluetooth stack 513, the audio interface 514, the Bluetooth transport driver 516, the TCP/IP stack 517, the WLAN stack 518, the UART controller 519, and the HCI 550. As discussed, the WLAN stack 518 may be used to decapsulate and decode PPDUs received over the Wi-Fi channel from the AP 620, and the TCP/IP stack 517 may be used to format audio data extracted from the received PPDUs. The UART controller 519 may provide an interface between the Bluetooth transport driver 516 and the Bluetooth subsystem 540 via the UART connection 541.

The audio subsystem 611 may be one example of the audio subsystem 520 of FIG. 5, and may be coupled to the application processor 612 through an HIDL interface. In some instances, the audio subsystem 611 may include various encoders and decoders, DSPs, codecs, and other circuitry that can be used to sample, encode, and otherwise process raw audio data provided by the application processor 612. In some instances, the raw audio data may be processed based at least in part on a Bluetooth profile associated with the audio data.

The WLAN subsystem 614 may be one example of the WLAN subsystem 530 of FIG. 5, and may be used to transmit and receive data, information, and other signals to and from other devices such as, for example, the AP 620. In some instances, the data packets transmitted by the AP 620 to the wireless communication device 610 may be one or more physical layer convergence protocol (PLCP) protocol data units (PPDUs) that are compliant with the IEEE 802.11 family of wireless communication standards.

The Bluetooth subsystem 615 may be one example of the Bluetooth subsystem 540 of FIG. 5, and may be used to transmit and receive data, information, and other signals to and from other devices in accordance with one or more Bluetooth transmission profiles or protocols. The Bluetooth subsystem 615 may also be used to pair the peripheral device 630 with the wireless communication device 610, thereby establishing a Bluetooth or BLE connection over which the wireless communication device 610 can transmit or stream information (such as audio data) to the peripheral device 630.

In various implementations, the communications 600 start with the AP 620 transmitting a number of data packets over the Wi-Fi channel to the wireless communication device 610. In the example of FIG. 6, the data packets may carry audio and/or video data that may be classified as latency-sensitive traffic as defined by Release 1 of the IEEE 802.11be amendments to the IEEE 802.11 family of wireless communication standards. In other implementations, the data packets may carry other types of data intended for the peripheral device 630.

The WLAN subsystem 614 receives the data packets transmitted from the AP 620, decodes the audio data carried in the data packets, and forwards the resulting audio packets to the application processor 612. In some instances, the audio data may be latency-sensitive traffic associated with a real-time application that can receive audio, video, and multimedia data streams or bursts from a server or other application resource through the AP 620. In some aspects, the audio data may be an audio stream associated with one or more of a real-time gaming application, a voice back-channel corresponding to the real-time gaming application, a real-time augmented reality (AR) application, a real-time virtual reality (VR) application, a real-time AR/VR application, streaming music, or streaming video.

The application processor 612 extracts raw audio data from the audio packets, applies one or more Bluetooth profiles to the raw audio data, and forwards the raw audio data to the audio subsystem 611 through the audio interface 514. The audio subsystem 611 may sample and encode the raw audio data, and then forward the encoded audio data to the WLAN subsystem 614 using the WLAN link 613 connected between the audio subsystem 611 and the WLAN subsystem 614. In some instances, the WLAN link 613 may be one implementation of the WLAN link 560 of FIG. 5. As discussed, sending the encoded audio data from the audio subsystem 611 to the WLAN subsystem 614 over the WLAN link 613 allows the encoded audio data to avoid latencies associated with the application processor 612 and the TCP/IP stack 517. In addition, routing the encoded audio data directly from the audio subsystem 611 to the WLAN subsystem 614 without passing through the application processor 612 may reduce power consumption of the application processor 612.

The WLAN subsystem 614 may be used to embed the encoded audio data into a number of Ethernet frames, and then encapsulate the Ethernet frames into one or more IEEE 802.11-compliant PPDUs. In some implementations, the encoded audio data is embedded within Ethernet frames of the new Ethertype disclosed herein. As discussed, the new Ethertype may indicate that the PPDUs carry Bluetooth or BLE audio data encapsulated within Ethernet frames intended for the peripheral device 630. In some aspects, each of the new Ethertype frames includes a real-time transport protocol (RTP) header indicating that the audio data is latency-sensitive traffic, an Ethernet header including an Ethertype field set to the new Ethertype, and a payload carrying encoded audio data intended for the peripheral device 630.

Thereafter, the WLAN subsystem 614 transmits the one or more PPDUs carrying the encoded audio data to the peripheral device 630 over the Wi-Fi channel. In some implementations, the Wi-Fi channel may be one or more wireless channels in a sub-GHz frequency band, a 2.4 GHz frequency band, a 5 GHz frequency band, a 6 GHz frequency band, or a 60 GHz frequency band. In some instances, the PPDUs carrying the encoded audio data may be transmitted to the peripheral device 630 over a direct link including (but not limited to) a P2P link, a TDLS link, or a Wi-Fi Direct link. In some aspects, the wireless communication device 610 may be a group owner (GO) that transmits the PPDUs carrying the encoded audio data to the peripheral device 630 over a direct link. In some other aspects, the wireless communication device 610 and the peripheral device 630 may be part of a neighborhood access network (NAN), and the PPDUs carrying the encoded audio data may be transmitted to the peripheral device 630 over a direct link associated with the NAN. In other implementations, the Wi-Fi channel may include one or more wireless channels in another suitable frequency band (e.g., a sub-GHz frequency band, a 60 GHz frequency band, and so on).

As discussed, rather than transmitting data packets carrying encoded audio data (or other latency-sensitive traffic) over a Bluetooth or BLE connection to the peripheral device 630, the WLAN subsystem 614 may embed the encoded audio data into the new Ethertype frames, encapsulate the new Ethertype frames into one or more IEEE 802.11-compliant PPDUs, and then transmit the one or more IEEE 802.11-compliant PPDUs to the peripheral device 630 over the wireless medium (e.g., over a Wi-Fi channel or link). In this way, the transmission of audio data from the wireless communication device 610 to the peripheral device 630 is not limited to Bluetooth frequency hopping in the 2.4 GHz frequency band; instead, the wireless communication device 610 can transmit the audio data to the peripheral device 630 over Wi-Fi channels in not only the 2.4 GHz frequency band but also in other frequency bands such as (but not limited to) sub-GHz frequency bands, the 5 GHz frequency band, the 6 GHz frequency band, or the 60 GHz frequency band.

The ability to transmit real-time audio data to the peripheral device 630 in one or more different frequency bands may allow such transmissions to avoid congestion and interference associated with the 2.4 GHz frequency band. For example, when latencies on Wi-Fi channels in the 2.4 GHz frequency band are greater than a certain level (e.g., due to interference from other Wi-Fi and/or Bluetooth devices operating in the 2.4 GHz frequency band), the wireless communication device 610 may transmit PPDUs carrying real-time audio data to the peripheral device 630 over one or more Wi-Fi channels in another frequency band, thereby avoiding interference and congestion associated with the 2.4 GHz frequency band.

The peripheral device 630 receives the data packets including the new Ethertype frames that carry the audio data encoded by the audio subsystem 611. The peripheral device 630 may decode the audio data, and then provide the resulting audio for output to a user (e.g., by playing the audio through speakers associated with the peripheral device 630).

Figure 7:
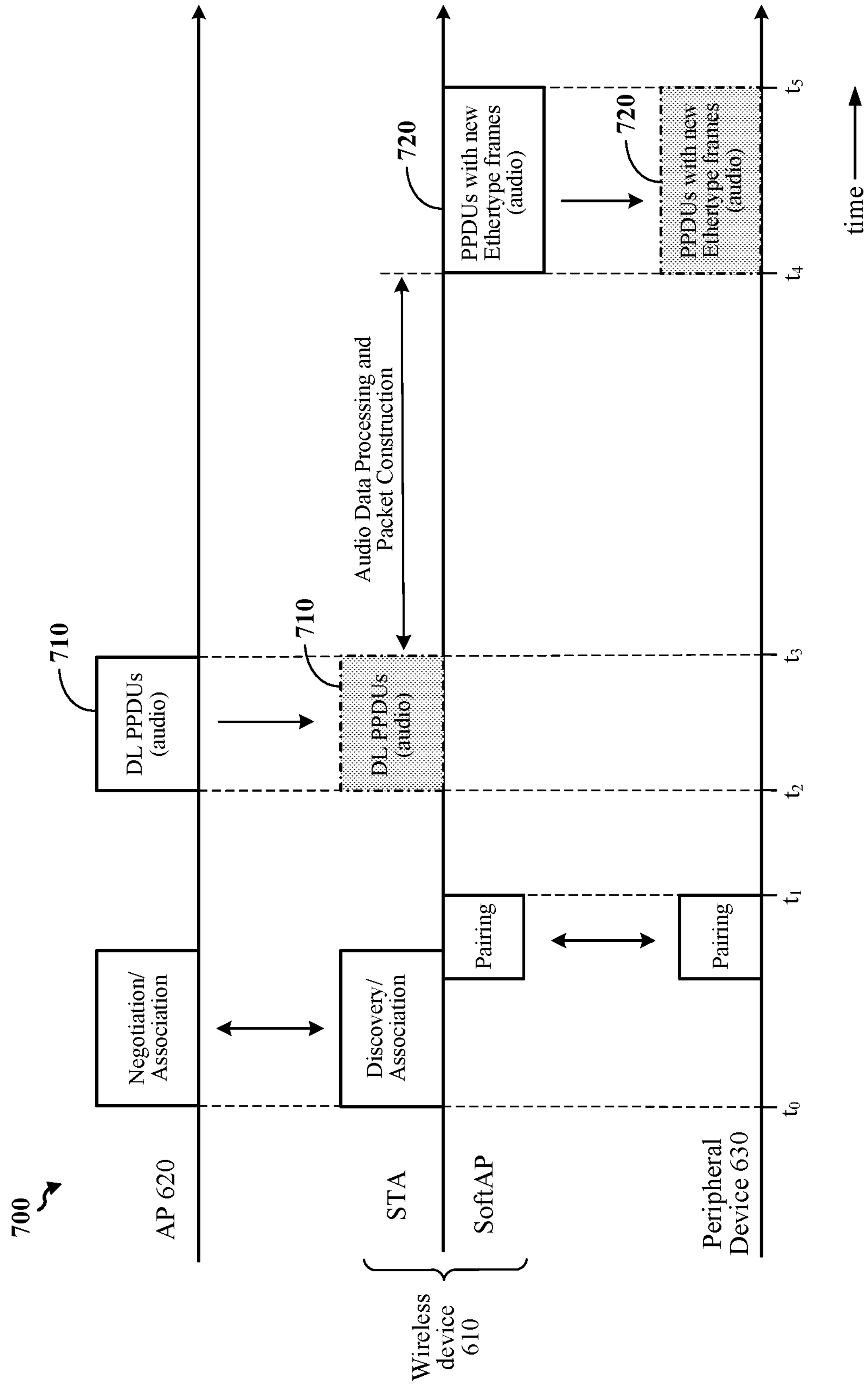
FIG. 7 shows a timing diagram depicting an example wireless communication that supports transmitting Bluetooth audio data to a peripheral device over a Wi-Fi link.

FIG. 7 shows a timing diagram depicting an example wireless communication 700 that supports transmitting Bluetooth audio data to a peripheral device over a Wi-Fi link. In some implementations, the wireless communication 700 may be performed between the wireless communication device 610, the AP 620, and the peripheral device 630 described with reference to FIG. 6. Thus, in some instances, the wireless communication device 610 may operate as a STA that is associated with the AP 620 while also operating as a softAP connected to the peripheral device 630. The AP 620 may be any suitable access point or access terminal that can operate a basic service set (BSS) on a Wi-Fi channel. The wireless communication device 610 may be an example of the central device 102 described with reference to FIG. 1, and the peripheral device 630 may be an example of one or more of the peripheral devices 104, 106, 108, 110, 112, or 114 described with reference to FIG. 1. In some instances, the peripheral device 630 may be one or more pairs of earbuds, one or more headphones, or one or more headsets. In some aspects, the wireless communication device 610 may communicate with the peripheral device 630 using a Bluetooth protocol, a BLE protocol, or a modified BLE protocol. For simplicity, the example of FIG. 7 depicts only one peripheral device 630 connected to the wireless communication device 610. In some other implementations, the wireless communication device 610 may be connected to or otherwise associated with more than one peripheral device 630.

Between times $t_0$ and $t_1$, the wireless communication device 610 may discover the AP 620, exchange capabilities and negotiate various parameters with the AP 620, and thereafter become associated with the AP and a member of the BSS operated by the AP 620. The wireless communication device 610 may also communicate with the peripheral device 630 using a Bluetooth or BLE protocol, for example, to pair the peripheral device 630 with the wireless communication device 610. In some instances, the peripheral device 630 may be paired with the softAP implemented by the wireless communication device 610.

At time $t_2$, the AP 620 transmits one or more DL PPDUs 710 over the Wi-Fi channel to the STA implemented by the wireless communication device 610. In some implementations, the one or more DL PPDUs 710 carry audio data intended for the peripheral device 630. In some instances, the audio data may be latency-sensitive traffic associated with a real-time application that, when executed by the STA, receives audio data from a server or other application resource through the AP 620. In some aspects, the audio data may be an audio stream associated with one or more of a real-time gaming application, a voice back-channel corresponding to the real-time gaming application, a real-time augmented reality (AR) application, a real-time virtual reality (VR) application, a real-time AR/VR application, streaming music, or streaming video.

The wireless communication device 610 (or STA) receives the one or more DL PPDUs 710 between times $t_2$ and $t_3$. The wireless communication device 610 (or STA) extracts the audio data carried in the DL PPDUs 710, and processes the audio data between times $t_3$ and $t_4$, for example, as described with reference to FIGS. 5 and 6. That is, the wireless communication device 610 (or STA) processes the audio data based at least in part on a stored Bluetooth profile, and formats the processed audio data into Ethertype frames that can be carried in one or more IEEE 802.11-compliant PPDUs. In various implementations, the wireless communication device 610 (or STA) may embed the processed audio data into Ethernet frames of the new Ethertype disclosed herein, and then encapsulate the new Ethertype frames into one or more IEEE 802.11-compliant PPDUs 720 for transmission to the peripheral device 630 over the Wi-Fi channel. In some instances, the new Ethertype indicates that audio data is encapsulated as Ethernet frames of the new Ethertype in one or more IEEE 802.11-compliant PPDUs. In some aspects, the new Ethertype may be a vendor-specific Ethertype. The wireless communication device 610 may process the received audio data and construct one or more IEEE 802.11-compliant PPDUs that carry encapsulated Bluetooth-encoded audio data between times $t_3$ and $t_4$.

At time $t_4$, the wireless communication device 610 (or softAP) transmits the PPDUs 720 carrying the audio data over the Wi-Fi channel to the peripheral device 630. Specifically, rather than transmitting the audio data to the peripheral device 630 over a Bluetooth or BLE connection, the wireless communication device 610 (or softAP) softAP transmits the PPDUs 720 over a Wi-Fi link or channel associated with the AP 620. In this way, the processed audio data can be transmitted to the peripheral device 630 over one or more wireless channels in a plurality of different frequency bands. For example, in some aspects, the PPDUs 720 may be transmitted to the peripheral device 630 over wireless channels in a sub-GHz frequency band, the 2.4 GHz frequency band, the 5 GHz frequency band, the 6 GHz frequency band, the 60 GHz frequency band, or any other suitable frequency band.

As discussed, the ability to transmit real-time audio data to the peripheral device 630 in one or more different frequency bands may allow such transmissions to avoid congestion and interference associated with the 2.4 GHz frequency band. For example, when latencies on Wi-Fi channels in the 2.4 GHz frequency band are greater than a certain level (e.g., due to interference from other Wi-Fi and/or Bluetooth devices operating in the 2.4 GHz frequency band), the wireless communication device 610 may transmit PPDUs carrying real-time audio data to the peripheral device 630 over one or more Wi-Fi channels in another frequency band, thereby avoiding interference and congestion associated with the 2.4 GHz frequency band.

The peripheral device 630 receives the PPDUs 720 between times $t_4$ and $t_5$. The peripheral device 630 may decode the audio data encapsulated in the PPDUs 720, and provide the resulting audio for output to a user. In some instances, the PPDUs 720 may be transmitted to the peripheral device 630 over a P2P link between the wireless communication device 610 (or softAP) and the peripheral device 630. In other instances, the PPDUs 720 may be transmitted to the peripheral device 630 over a TDLS link. In some other instances, the PPDUs 720 may be transmitted to the peripheral device 630 over a Wi-Fi Direct link. In other implementations, the wireless communication device 610 may be a group owner (GO) that transmits the PPDUs 720 to the peripheral device 630 over a direct link. In some other implementations, the wireless communication device 610 and the peripheral device 630 may be part of a NAN, and the PPDUs 720 may be transmitted to the peripheral device 630 over a direct link associated with the NAN.

Figure 8:
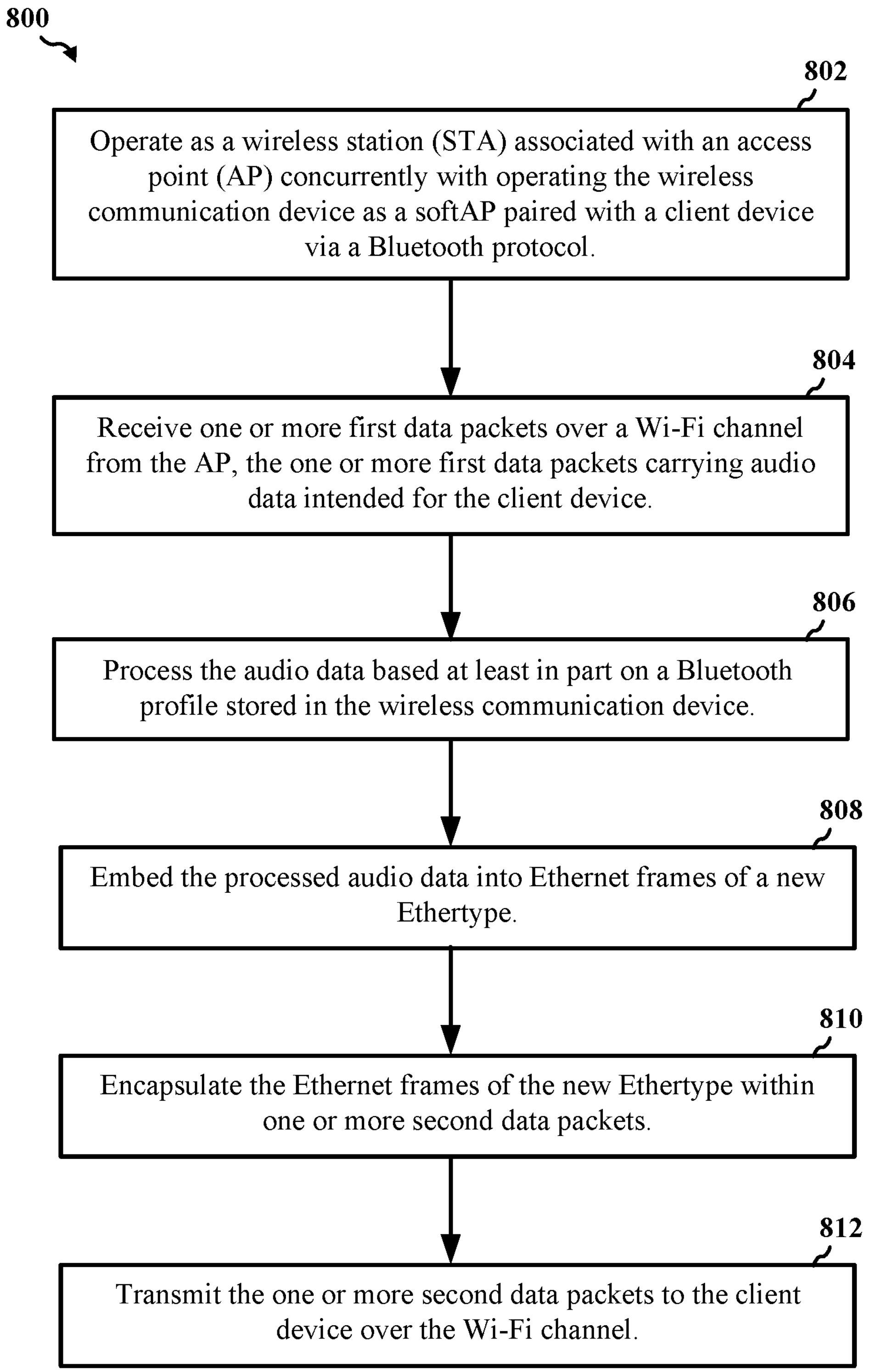
FIG. 8 shows a flowchart illustrating an example operation for wireless communication that supports transmitting Bluetooth audio data to a peripheral device over a Wi-Fi link.

FIG. 8 shows a flowchart illustrating an example operation 800 for wireless communication that supports transmitting Bluetooth audio data to a peripheral device over a Wi-Fi link or channel. The operation 800 may be performed by an apparatus of a wireless communication device such as the wireless devices 200 and 500 described with reference to FIGS. 2 and 5, respectively. In some implementations, the operation 800 may be performed by a wireless communication device operating as or within a STA. In some other implementations, the operation 800 may be performed by the central device 102 described with reference to FIG. 1.

For example, at block 802, the wireless communication device operates as a wireless station (STA) associated with an access point (AP) concurrently with operating the wireless communication device as a softAP paired with a peripheral device via a Bluetooth protocol. At block 804, the wireless communication device receives one or more first data packets over a Wi-Fi channel from the AP, the one or more first data packets carrying audio data intended for the peripheral device. At block 806, the wireless communication device processes the audio data based at least in part on a Bluetooth profile stored in the wireless communication device. At block 808, the wireless communication device embeds the processed audio data into Ethernet frames of a new Ethertype. At block 810, the wireless communication device encapsulates the Ethernet frames of the new Ethertype within one or more second data packets. At block 812, the wireless communication device transmits the one or more second data packets to the peripheral device over the Wi-Fi channel. In some implementations, the wireless communication device is a smartphone, and the peripheral device is one or more headphones, headsets, or pairs of earbuds. In some instances, the audio data is an audio stream associated with a real-time gaming application. In some aspects, the Wi-Fi channel may be one or more wireless channels in a sub-GHz frequency band, a 2.4 GHz frequency band, a 5 GHz frequency band, a 6 GHz frequency band, or a 60 GHz frequency band.

In some implementations, the one or more second data packets are transmitted to the peripheral device via a peer-to-peer (P2P) link, a tunneled direct-link setup (TDLS) link, or a Wi-Fi Direct link. In some instances, the first and second data packets are physical layer convergence protocol (PLCP) protocol data units (PPDUs) compliant with the IEEE 802.11 family of wireless communication standards.

In some implementations, the Ethernet frames are non-Internet Protocol (IP) data frames. In some instances, the new Ethertype is a vendor-specific Ethertype. In some aspects, the new Ethertype indicates that the one or more second data packets carry audio data intended for the peripheral device. In some other aspects, each Ethernet frame includes a real-time transport protocol (RTP) header, an Ethernet header, and a payload. The RTP header may indicate the RTP profile and payload formats of the Ethernet frames (e.g., the codecs used to encode the payload data and their mapping to payload format codes in the protocol field Payload Type (PT) of the RTP header). In some aspects, the RTP header may also indicate that the audio data is latency-sensitive traffic. The Ethernet header may include a MAC header carrying the source and destination addresses of the Ethernet frames, and may include an Ethertype field set to the new Ethertype. The payload may include one or more of the new Ethertype frames that carry the encoded audio data intended for the peripheral device.

Figure 9:
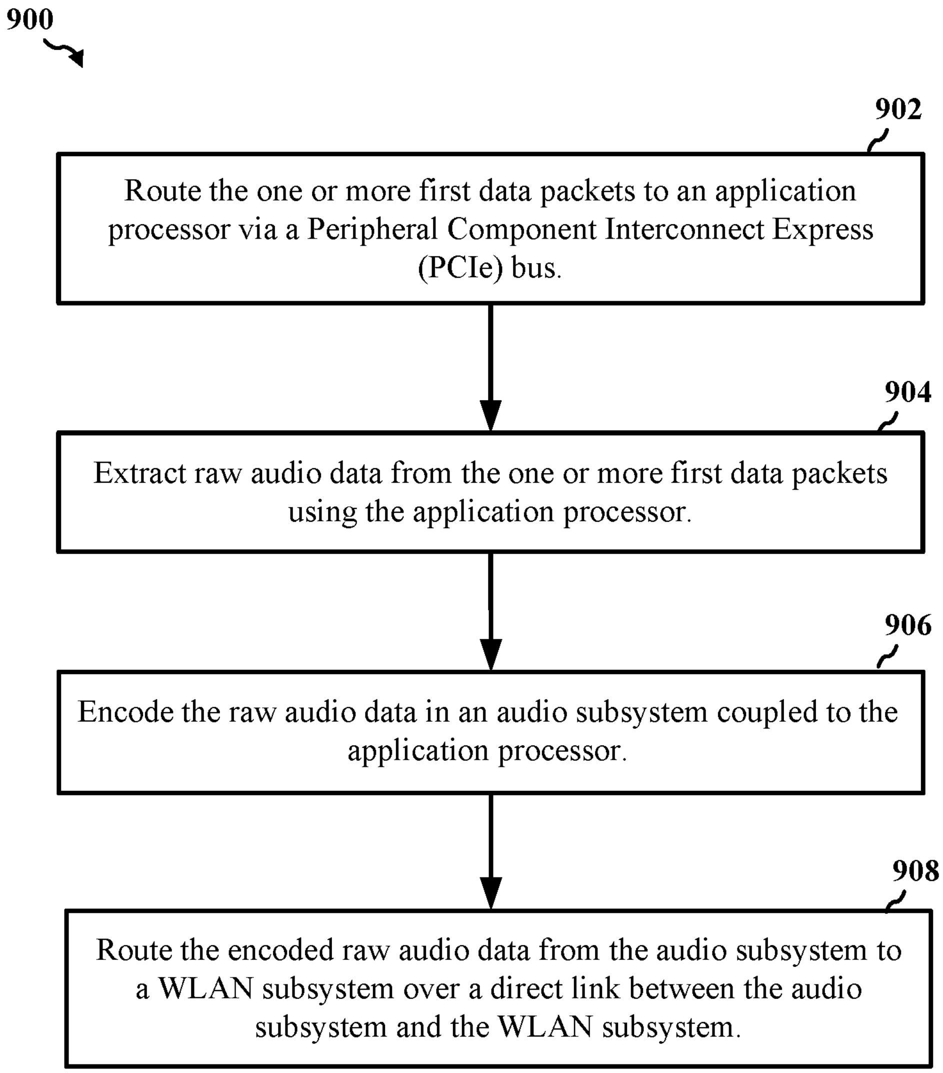
FIG. 9 shows a flowchart illustrating another example operation for wireless communication that supports transmitting Bluetooth audio data to a peripheral device over a Wi-Fi link.

FIG. 9 shows a flowchart illustrating an example operation 900 for wireless communication that supports transmitting Bluetooth audio data to a peripheral device over a Wi-Fi link or channel. The operation 900 may be performed by an apparatus of a wireless communication device such as the wireless devices 200 and 500 described with reference to FIGS. 2 and 5, respectively. In some implementations, the operation 900 may be performed by a wireless communication device operating as or within a STA. In some other implementations, the operation 900 may be performed by the central device 102 described with reference to FIG. 1.

In some instances, the operation 900 may be one example of processing the audio data in block 806 of FIG. 8. For example, at block 902, the wireless communication device routes the one or more first data packets to an application processor via a Peripheral Component Interconnect Express (PCIe) bus. At block 904, the wireless communication device extracts raw audio data from the one or more first data packets using the application processor. At block 906, the wireless communication device encodes the raw audio data in an audio subsystem coupled to the application processor. At block 908, the wireless communication device routes the encoded raw audio data from the audio subsystem to a WLAN subsystem over a direct link between the audio subsystem and the WLAN subsystem. In some aspects, the WLAN subsystem is configured to encapsulate the Ethernet frames within the one or more second data packets based on the new Ethertype, and to transmit the one or more second data packets encapsulating the new Ethertype frames over a WLAN link or channel to the peripheral device.

The direct link, which may be based on a PCIe bus architecture, can route the encoded audio data from the audio subsystem to the WLAN subsystem without passing through the application processor or accessing the TCP/IP stack within or associated with the application processor. In this way, the direct link between the audio subsystem and the WLAN subsystem allows the encoded audio data to avoid latencies associated with the application processor 1206 and the TCP/IP stack, respectively.

Figure 10:
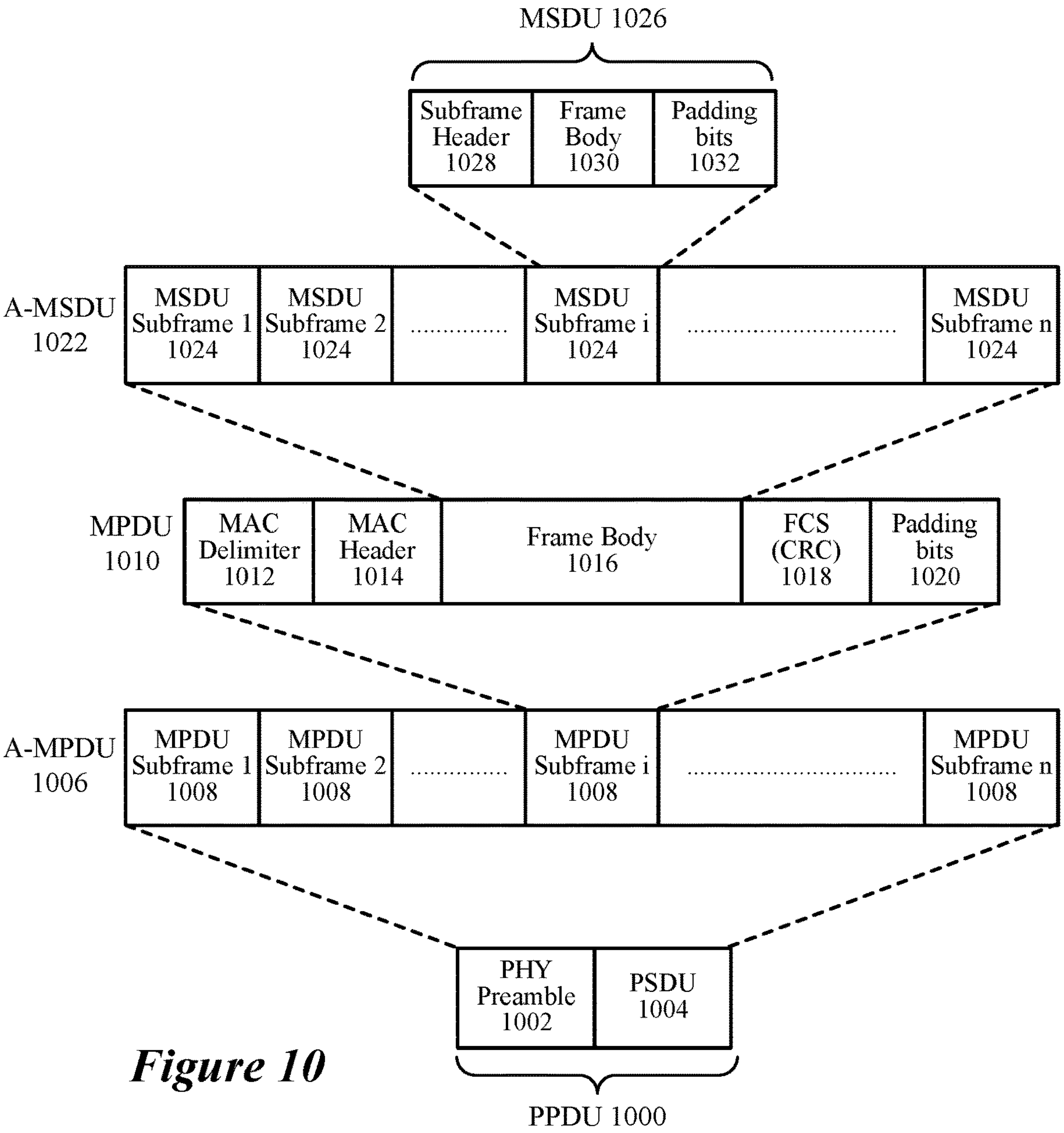
FIG. 10 shows an example physical layer convergence protocol (PLCP) protocol data unit (PPDU) usable for communication that supports transmitting Bluetooth audio data over a Wi-Fi link.

FIG. 10 shows an example PPDU 1000 usable for communications between wireless communication devices (such as an AP and a number of STAs) operating in accordance with the IEEE 802.11 family of wireless communication standards. Each PPDU 1000 includes a PHY preamble 1002 and a PSDU 1004. Each PSDU 1004 may carry one or more MAC protocol data units (MPDUs), for example, such as an aggregated MPDU (A-MPDU) 1006 that includes multiple MPDU subframes 1008. Each MPDU subframe 1008 may include a MAC delimiter 1012 and a MAC header 1014 prior to the accompanying frame body 1016, which includes the data portion or "payload" of the MPDU subframe 1008. The frame body 1016 may carry one or more MAC service data units (MSDUs), for example, such as an aggregated MSDU (A-MSDU) 1022 that includes multiple MSDU subframes 1024. Each MSDU subframe 1024 contains a corresponding MSDU 1026 including a subframe header 1028, a frame body 1030, and one or more padding bits 1032.

Referring back to the A-MPDU subframe 1006, the MAC header 1014 may include a number of fields containing information that defines or indicates characteristics or attributes of data encapsulated within the frame body 1016. The MAC header 1014 also includes a number of fields indicating addresses for the data encapsulated within the frame body 1016. For example, the MAC header 1014 may include a combination of a source address, a transmitter address, a receiver address, or a destination address. The MAC header 1014 may include a frame control field containing control information. The frame control field specifies the frame type, for example, a data frame, a control frame, or a management frame. The MAC header 1014 may further include a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 1008 also may include a frame check sequence (FCS) field 1018 for error detection. For example, the FCS field 1018 may include a cyclic redundancy check (CRC), and may be followed by one or more padding bits 1020.

Figure 11:
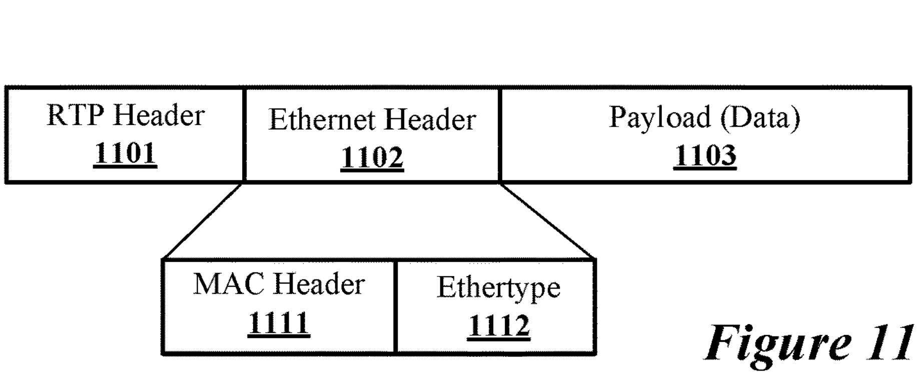
FIG. 11 shows an example format of an Ethernet frame suitable for use in wireless communication that supports transmitting Bluetooth audio data to a peripheral device over a Wi-Fi link.

FIG. 11 shows an example format of an Ethernet frame 1100 suitable for use in wireless communication that supports transmitting Bluetooth audio data over a Wi-Fi link. The Ethernet frame 1100 includes an RTP header 1101, an Ethernet header 1102, and a Payload 1103. The RTP header 1101 may indicate the RTP profile and payload formats of the Ethernet frame 1100. For example, the RTP profile may indicate the codecs used to encode the payload data and their mapping to payload format codes in the protocol field Payload Type (PT) of the RTP header.

The Ethernet header 1102 may include a MAC header 1111 and an Ethertype field 1112. The MAC header 1111 may include a Source Address field indicating the MAC address of the transmitter device, a Destination Address field indicating the MAC address of the receiver device, and a Length/Type field indicating the length and type of the Ethernet frame 1100. The Ethertype field 1112 indicates the Ethertype of the Ethernet frame 1100. In some instances, the Ethertype field 1112 indicates the new Ethertype disclosed herein, for example, to signal that the Ethernet frame 1100 carries encoded audio data intended for one or more peripheral Bluetooth devices. As discussed, the new Ethertype may also signal that the Ethernet frame 1100 is encapsulated within an IEEE 802.11-compliant data packet (such as the PPDU 1000 of FIG. 10).

The Payload 1103 carries one or more encapsulated data packets of a specified Ethertype. In some instances, the one or more encapsulated data packets may the new Ethertype frames disclosed herein. In some other instances, the Payload 1103 carries latency-sensitive traffic (such as real-time audio or video data).

Figure 12:
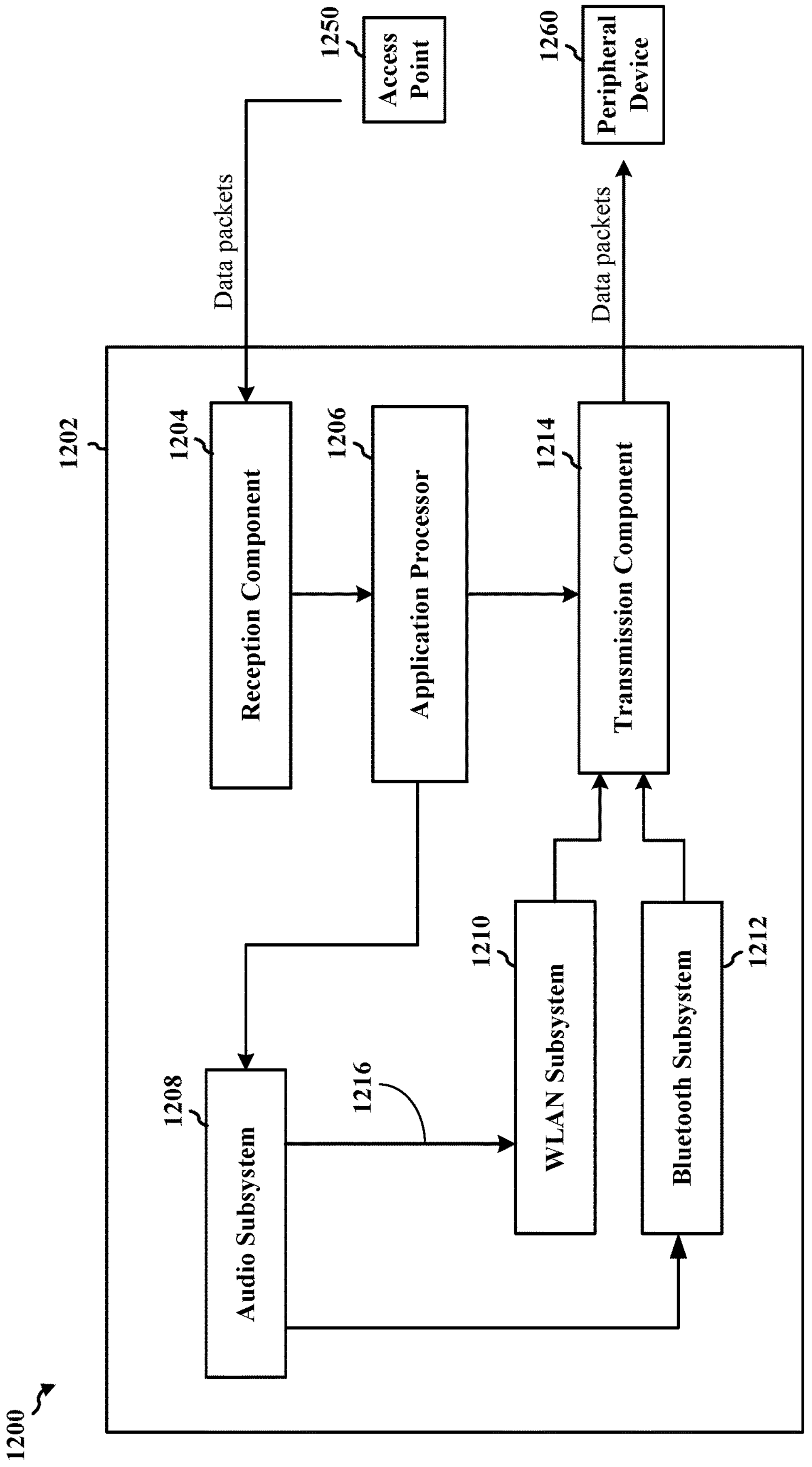
FIG. 12 shows a conceptual data flow diagram illustrating the data flow between different means/components in an example apparatus.

FIG. 12 is a conceptual data flow diagram 1200 illustrating the data flow between different means and/or components of an example apparatus 1202. In some implementations, the apparatus may be a wireless communication device that operates as a wireless station (STA) associated with an access point (AP) while also operating as a softAP associated with a peripheral device. The apparatus includes a reception component 1204 that receives data packets from the AP 1250. The apparatus also includes an application processor 1206, an audio subsystem 1208, a WLAN subsystem 1210, a Bluetooth subsystem 1212, a transmission component 1214, and a direct link 1216 connected between the audio subsystem 1208 and the WLAN subsystem 1210.

The application processor 1206 extracts audio data from the data packets received from the AP 1250, attaches or applies a Bluetooth profile to the extracted audio data, and routes the extracted audio data to the audio subsystem 1208. The audio subsystem 1208 encodes the audio data, and routes the encoded audio data to the WLAN subsystem 1210 via the direct link 1216. As discussed, the direct link 1216 allows the encoded audio data to be routed directly to the WLAN subsystem 1210 without going through the application processor 1206 and without accessing the TCP/IP stack within or associated with the application processor 1206, thereby avoiding latencies associated with the application processor 1206 and the TCP/IP stack, respectively. The WLAN subsystem 1210 embeds the encoded audio data into Ethernet frames of the new Ethertype, and encapsulates the new Ethertype frames within one or more IEEE 802.11-compliant data packets. The Bluetooth subsystem 1212 can establish a Bluetooth session or connection with the peripheral device, and can facilitate the transmission of data and other information to the peripheral device 1260 using Bluetooth communications (e.g., as one or more Bluetooth frames or packets). The transmission component 1214 is coupled to the WLAN subsystem 1210 and the Bluetooth subsystem 1212, and may be used to transmit frames or packets provided by the WLAN subsystem 1210 and/or the Bluetooth subsystem 1212. In some implementations, the transmission component 1214 may transmit data packets containing encoded audio data embedded in the new Ethertype frames over a Wi-Fi link or channel to the peripheral device 1260. In some instances, the transmission component 1214 may transmit data to the peripheral device 1260 over a Bluetooth link or connection. In some other instances, various aspects of the transmission component 1214 may be integrated within each of the WLAN subsystem 1210 and the Bluetooth subsystem 1212.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
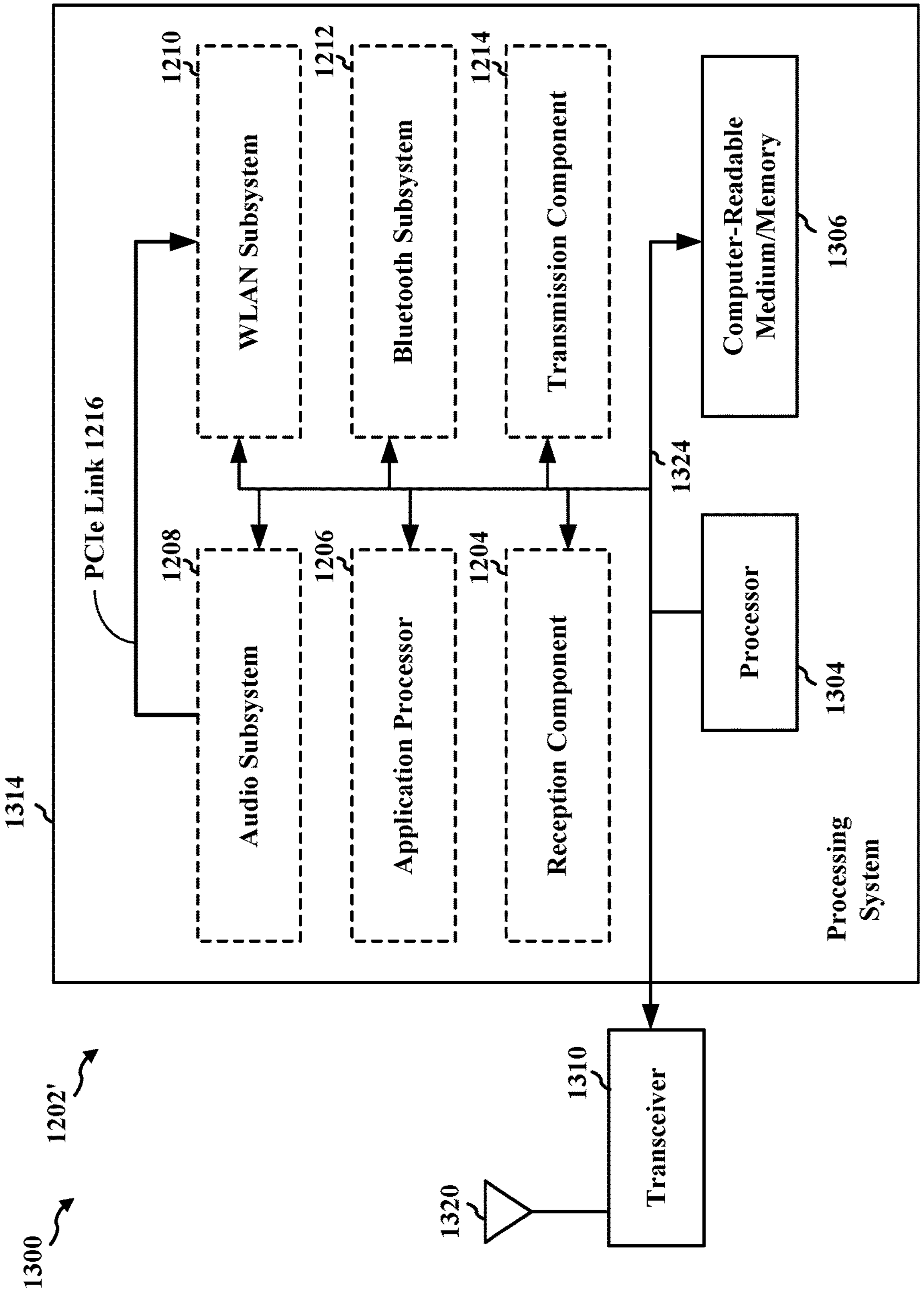
FIG. 13 shows a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, and 1214 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1214, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, and 1214. The components may be software components running in the processor 1304, resident/stored in the computer readable medium/memory 1306, one or more hardware components coupled to the processor 1304, or some combination thereof.

In certain configurations, the apparatus 1202/1202' for wireless communication may include means for all means limitations described herein. The aforementioned means may be the processor(s) 202, the radio 230, the MMU 240, the WLAN controller 250, the short-range communication controller 252, the WWAN controller 256, one or more of the aforementioned components of the apparatus 1202 and/or the processing system 1314 of the apparatus 1202' configured to perform the functions recited by the aforementioned means.

In one configuration, the apparatus 1302/1302' for wireless communication includes means for operating the wireless communication device as a wireless station (STA) associated with an access point (AP) concurrently with operating the wireless communication device as a softAP paired with a peripheral device via a Bluetooth protocol, means for receiving one or more first data packets over a Wi-Fi channel from the AP, the one or more first data packets carrying audio data intended for the peripheral device, means for processing the audio data based at least in part on a Bluetooth profile stored in the wireless communication device, means for embedding the processed audio data into Ethernet frames of a new Ethertype, means for encapsulating the Ethernet frames of the new Ethertype within one or more second data packets, and means for transmitting the one or more second data packets to the peripheral device over the Wi-Fi channel. The aforementioned means may be one or more of the aforementioned components of the apparatus 1302 and/or the processing system 1214 of the apparatus 1302' configured to perform the functions recited by the aforementioned means. As described supra, the processing system 1214 may include the processors 202, the memory 206, the flash memory 210, and/or the ROM 208 of FIG. 2.

Implementation examples are described in the following numbered clauses:

1. A method for wireless communication by a wireless communication device, including:
   operating the wireless communication device as a wireless station (STA) associated with an access point (AP) concurrently with operating the wireless communication device as a softAP paired with a peripheral device according to a Bluetooth protocol;
   receiving one or more first data packets over a Wi-Fi channel from the AP, the one or more first data packets carrying audio data intended for the peripheral device;
   processing the audio data based at least in part on a Bluetooth profile stored in the wireless communication device;
   embedding the processed audio data into Ethernet frames of a new Ethertype;
   encapsulating the Ethernet frames of the new Ethertype within one or more second data packets; and
   transmitting the one or more second data packets to the peripheral device over the Wi-Fi channel.
2. The method of clause 1, where the Wi-Fi channel is a wireless channel in a sub-GHz frequency band, a 2.4 GHz frequency band, a 5 GHz frequency band, a 6 GHz frequency band, or a 60 GHz frequency band.
3. The method of any one or more of clauses 1-2, where the audio data includes latency-sensitive traffic associated with a real-time application executed by the wireless communication device.
4. The method of any one or more of clauses 1-3, where the one or more second data packets are transmitted to the peripheral device via a peer-to-peer (P2P) link, a tunneled direct-link setup (TDLS) link, a Wi-Fi Direct link, a link associated with a Group Owner (GO), or a link associated with a Neighborhood Area Network (NAN).
5. The method of any one or more of clauses 1-4, where the first and second data packets include physical layer convergence protocol (PLCP) protocol data units (PPDUs) compliant with the IEEE 802.11 family of wireless communication standards.
6. The method of any one or more of clauses 1-5, where the Ethernet frames include non-Internet Protocol (IP) data frames.
7. The method of any one or more of clauses 1-6, where processing the audio data includes:
   routing the one or more first data packets to an application processor via a Peripheral Component Interconnect Express (PCIe) bus;
   extracting raw audio data from the one or more first data packets using the application processor;
   encoding the raw audio data in an audio subsystem coupled to the application processor; and
   routing the encoded raw audio data from the audio subsystem to a WLAN subsystem over a direct link between the audio subsystem and the WLAN subsystem.
8. The method of clause 7, where the WLAN subsystem is configured to encapsulate the Ethernet frames within the one or more second data packets based on the new Ethertype.
9. The method of clause 8, where the WLAN subsystem is further configured to transmit the one or more second data packets over a WLAN link to the peripheral device.
10. The method of any one or more of clauses 7-9, where the direct link is based on a PCIe bus architecture.
11. The method of any one or more of clauses 7-10, where the encoded raw audio data is routed from the audio subsystem to the WLAN subsystem without accessing the application processor.
12. The method of any one or more of clauses 7-11, where the encoded raw audio data is routed from the audio subsystem to the WLAN subsystem without accessing a Transport Control Protocol (TCP)/Internet Protocol (IP) (TCP/IP) stack.
13. The method of any one or more of clauses 1-12, where the wireless communication device includes a smartphone, and the peripheral device includes one or more pairs of earbuds, one or more headphones, or one or more headsets.
14. The method of any one or more of clauses 1-13, where the audio data includes an audio stream associated with one or more of a real-time gaming application, a voice back-channel corresponding to the real-time gaming application, a real-time augmented reality (AR) application, a real-time virtual reality (VR) application, a real-time AR/VR application, streaming music, or streaming video.

15. A wireless communication device, including:

one or more wireless radios;

one or more processors coupled to the one or more wireless radios; and a memory coupled to the one or more processors and storing instructions that, when executed by the one or more processors in conjunction with the one or more wireless radios, is configured to:

operate the wireless communication device as a wireless station (STA) associated with an access point (AP) concurrently with operating the wireless communication device as a softAP paired with a peripheral device according to a Bluetooth protocol;

receive one or more first data packets over a Wi-Fi channel from the AP, the one or more first data packets carrying audio data intended for the peripheral device;

process the audio data based at least in part on a Bluetooth profile stored in the wireless communication device;

embed the processed audio data into Ethernet frames of a new Ethertype;

encapsulate the Ethernet frames of the new Ethertype within one or more second data packets; and transmit the one or more second data packets to the peripheral device over the Wi-Fi channel.

16. The wireless communication device of clause 15, where the Wi-Fi channel is a wireless channel in a sub-GHz frequency band, a 2.4 GHz frequency band, a 5 GHz frequency band, a 6 GHz frequency band, or a 60 GHz frequency band.

17. The wireless communication device of any one or more of clauses 15-16, where the audio data includes latency-sensitive traffic associated with a real-time application executed by the wireless communication device.

18. The wireless communication device of any one or more of clauses 15-17, where the one or more second data packets are transmitted to the peripheral device via a peer-to-peer (P2P) link, a tunneled direct-link setup (TDLS) link, a Wi-Fi Direct link, a link associated with a Group Owner (GO), or a link associated with a Neighborhood Area Network (NAN).

19. The wireless communication device of any one or more of clauses 15-18, where the first and second data packets include physical layer convergence protocol (PLCP) protocol data units (PPDUs) compliant with the IEEE 802.11 family of wireless communication standards.

20. The wireless communication device of any one or more of clauses 15-19, where the Ethernet frames include non-Internet Protocol (IP) data frames.

21. The wireless communication device of any one or more of clauses 15-20, where execution of the instructions to process the audio data includes:

routing the one or more first data packets to an application processor via a Peripheral Component Interconnect Express (PCIe) bus;

extracting raw audio data from the one or more first data packets using the application processor;

encoding the raw audio data in an audio subsystem coupled to the application processor; and routing the encoded raw audio data from the audio subsystem to a WLAN subsystem over a direct link between the audio subsystem and the WLAN subsystem.

22. The wireless communication device of clause 21, where the audio subsystem includes one or more digital signal processors (DSPs).

23. The wireless communication device of any one or more of clauses 21-22, where the WLAN subsystem is configured to encapsulate the Ethernet frames within the one or more second data packets based on the new Ethertype.

24. The wireless communication device of clause 23, where the WLAN subsystem is further configured to transmit the one or more second data packets over a WLAN link to the peripheral device.

25. The wireless communication device of any one or more of clauses 21-24, where the direct link is based on a PCIe bus architecture.

26. The wireless communication device of any one or more of clauses 21-25, where the encoded raw audio data is routed from the audio subsystem to the WLAN subsystem without accessing the application processor.

27. The wireless communication device of any one or more of clauses 21-26, where the encoded raw audio data is routed from the audio subsystem to the WLAN subsystem without accessing a Transport Control Protocol (TCP)/Internet Protocol (IP) (TCP/IP) stack.

28. The wireless communication device of any one or more of clauses 15-27, where the wireless communication device includes a smartphone, and the peripheral device includes one or more pairs of earbuds, one or more headphones, or one or more headsets.

29. The wireless communication device of any one or more of clauses 15-28, where the audio data includes an audio stream associated with one or more of a real-time gaming application, a voice back-channel corresponding to the real-time gaming application, a real-time augmented reality (AR) application, a real-time virtual reality (VR) application, a real-time AR/VR application, streaming music, or streaming video.

30. A wireless communication device, including:

a WLAN subsystem configured to receive one or more first data packets over a Wi-Fi channel from an access point (AP), the one or more first data packets carrying audio data intended for a peripheral device associated with a softAP implemented by the wireless communication device;

a Bluetooth subsystem configured to establish a Bluetooth link with the peripheral device;

an application processor coupled to the WLAN subsystem by a Peripheral Component Interconnect Express (PCIe) bus, the application processor configured to extract raw audio data from the one or more first data packets;

an audio subsystem coupled to the application processor, the audio subsystem configured to encode the raw audio data based at least in part on a Bluetooth profile; and a direct link connected between the audio subsystem and the WLAN subsystem, the direct link configured to route the encoded raw audio data directly to the WLAN subsystem for transmission to the peripheral device.

31. The wireless communication device of clause 30, where the Wi-Fi channel is a wireless channel in a sub-GHz frequency band, a 2.4 GHz frequency band, a 5 GHz frequency band, a 6 GHz frequency band, or a 60 GHz frequency band.

32. The wireless communication device of any one or more of clauses 30-31, where the WLAN subsystem is further configured to: embed the encoded raw audio data into Ethernet frames of a new Ethertype; encapsule the Ethernet frames within one or more second data packets; and transmit the one or more second data packets over a WLAN link to the peripheral device.

33. The wireless communication device of clause 32, where the WLAN subsystem is configured to transmit the one or more second data packets to the peripheral device via a peer-to-peer (P2P) link, a tunneled direct-link setup (TDLS) link, a Wi-Fi Direct link, a link associated with a Group Owner (GO), or a link associated with a Neighborhood Area Network (NAN).

34. The wireless communication device of any one or more of clauses 30-33, where the first and second data packets include physical layer convergence protocol (PLCP) protocol data units (PPDUs) compliant with the IEEE 802.11 family of wireless communication standards.

35. The wireless communication device of any one or more of clauses 30-34, where the Ethernet frames are non-Internet Protocol (IP) data frames.

36. The wireless communication device of any one or more of clauses 30-35, where the direct link is a based on a PCIe bus architecture.

37. The wireless communication device of any one or more of clauses 30-36, where the encoded raw audio data is routed from the audio subsystem to the WLAN subsystem via the direct link without accessing the application processor.

38. The wireless communication device of any one or more of clauses 30-37, where the encoded raw audio data is routed from the audio subsystem to the WLAN subsystem via the direct link without accessing a Transport Control Protocol (TCP)/Internet Protocol (IP) (TCP/IP) stack.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A method for wireless communication by a wireless communication device, comprising:

operating the wireless communication device as a wireless station (STA) associated with an access point (AP) concurrently with operating the wireless communication device as a software-enabled Access Point (softAP) paired with a peripheral device according to a Bluetooth protocol;

receiving one or more first data packets over a Wi-Fi channel from the AP, the one or more first data packets carrying audio data intended for the peripheral device;

processing the audio data based at least in part on a Bluetooth profile stored in the wireless communication device;

embedding the processed audio data into Ethernet frames of a new Ethertype;

encapsulating the Ethernet frames of the new Ethertype within one or more second data packets;

transmitting the one or more second data packets to the peripheral device over the Wi-Fi channel; and wherein processing the audio data includes:

routing the one or more first data packets to an application processor via a Peripheral Component Interconnect Express (PCIe) bus;

extracting raw audio data from the one or more first data packets using the application processor;

encoding the raw audio data in an audio subsystem coupled to the application processor; and routing the encoded raw audio data from the audio subsystem to a wireless local area network (WLAN) subsystem over a direct link between the audio subsystem and the WLAN subsystem.

2. The method of claim 1, wherein the Wi-Fi channel comprises a wireless channel in a sub-GHz frequency band, a 2.4 GHz frequency band, a 5 GHz frequency band, a 6 GHz frequency band, or a 60 GHz frequency band.

3. The method of claim 1, wherein the audio data comprises latency-sensitive traffic associated with a real-time application executed by the wireless communication device.

4. The method of claim 1, wherein the one or more second data packets are transmitted to the peripheral device via a peer-to-peer (P2P) link, a tunneled direct-link setup (TDLS) link, a Wi-Fi Direct link, a link associated with a Group Owner (GO), or a link associated with a Neighborhood Area Network (NAN).

5. The method of claim 1, wherein the first and second data packets comprise physical layer convergence protocol (PLCP) protocol data units (PPDUs) compliant with the IEEE 802.11 family of wireless communication standards.

6. The method of claim 1, wherein the Ethernet frames comprise non-Internet Protocol (IP) data frames.

7. The method of claim 1, wherein the WLAN subsystem is configured to encapsulate the Ethernet frames within the one or more second data packets based on the new Ethertype.

8. The method of claim 7, wherein the WLAN subsystem is further configured to transmit the one or more second data packets over a WLAN link to the peripheral device.

9. The method of claim 1, wherein the direct link is based on a PCIe bus architecture.

10. The method of claim 1, wherein the encoded raw audio data is routed from the audio subsystem to the WLAN subsystem without accessing the application processor.

11. The method of claim 1, wherein the encoded raw audio data is routed from the audio subsystem to the WLAN subsystem without accessing a Transport Control Protocol (TCP)/Internet Protocol (IP) (TCP/IP) stack.

12. The method of claim 1, wherein the wireless communication device comprises a smartphone, and the peripheral device comprises one or more pairs of earbuds, one or more headphones, or one or more headsets.

13. The method of claim 1, wherein the audio data comprises an audio stream associated with one or more of a real-time gaming application, a voice back-channel corresponding to the real-time gaming application, a real-time augmented reality (AR) application, a real-time virtual reality (VR) application, a real-time AR/VR application, streaming music, or streaming video.

14. A wireless communication device, comprising:

one or more wireless radios;

one or more processors coupled to the one or more wireless radios; and a memory coupled to the one or more processors and storing instructions that, when executed by the one or more processors in conjunction with the one or more wireless radios, is configured to:

operate the wireless communication device as a wireless station (STA) associated with an access point (AP) concurrently with operating the wireless communication device as a software-enabled Access Point (softAP) paired with a peripheral device over a Bluetooth communication link;

receive one or more first data packets over a Wi-Fi channel from the AP, the one or more first data packets carrying audio data intended for the peripheral device;

process the audio data based at least in part on a Bluetooth profile stored in the wireless communication device;

embed the processed audio data into Ethernet frames of a new Ethertype;

encapsulate the Ethernet frames of the new Ethertype within one or more second data packets;

transmit the one or more second data packets to the peripheral device over the Wi-Fi channel; and wherein execution of the instructions to process the audio data includes:

routing the one or more first data packets to an application processor via a Peripheral Component Interconnect Express (PCIe) bus;

extracting raw audio data from the one or more first data packets using the application processor;

encoding the raw audio data in an audio subsystem coupled to the application processor;

and routing the encoded raw audio data from the audio subsystem to a WLAN subsystem over a direct link between the audio subsystem and the WLAN subsystem.

15. The wireless communication device of claim 14, wherein the Wi-Fi channel comprises a wireless channel in a sub-GHz frequency band, a 2.4 GHz frequency band, a 5 GHz frequency band, a 6 GHz frequency band, or a 60 GHz frequency band.

16. The wireless communication device of claim 14, wherein the audio data comprises latency-sensitive traffic associated with a real-time application executed by the wireless communication device.

17. The wireless communication device of claim 14, wherein the one or more second data packets are transmitted to the peripheral device via a peer-to-peer (P2P) link, a tunneled direct-link setup (TDLS) link, a Wi-Fi Direct link, a link associated with a Group Owner (GO), or a link associated with a Neighborhood Area Network (NAN).

18. The wireless communication device of claim 14, wherein the first and second data packets comprise physical layer convergence protocol (PLCP) protocol data units PPDUs) compliant with the IEEE 802.11 family of wireless communication standards.

19. The wireless communication device of claim 14, wherein the Ethernet frames comprise non-Internet Protocol (IP) data frames.

20. The wireless communication device of claim 14, wherein the audio subsystem includes one or more digital signal processors (DSPs).

21. The wireless communication device of claim 14, wherein the WLAN subsystem is configured to encapsulate the Ethernet frames within the one or more second data packets based on the new Ethertype.

22. The wireless communication device of claim 21, wherein the WLAN subsystem is further configured to transmit the one or more second data packets over a WLAN link to the peripheral device.

23. The wireless communication device of claim 14, wherein the direct link is based on a PCIe bus architecture.

24. The wireless communication device of claim 14, wherein the encoded raw audio data is routed from the audio subsystem to the WLAN subsystem without accessing the application processor.

25. The wireless communication device of claim 14, wherein the encoded raw audio data is routed from the audio subsystem to the WLAN subsystem without accessing a Transport Control Protocol (TCP)/Internet Protocol (IP) (TCP/IP) stack.

26. The wireless communication device of claim 14, wherein the wireless communication device comprises a smartphone, and the peripheral device comprises one or more pairs of earbuds, one or more headphones, or one or more headsets.

27. The wireless communication device of claim 14, wherein the audio data comprises an audio stream associated with one or more of a real-time gaming application, a voice back-channel corresponding to the real-time gaming application, a real-time augmented reality (AR) application, a real-time virtual reality (VR) application, a real-time AR/VR application, streaming music, or streaming video.

* * * * *